US012162285B2

(12) United States Patent
Owaku

(10) Patent No.: US 12,162,285 B2
(45) Date of Patent: Dec. 10, 2024

(54) LIQUID EJECTING HEAD AND LIQUID EJECTING APPARATUS

(71) Applicant: SEIKO EPSON CORPORATION, Tokyo (JP)

(72) Inventor: Takeshi Owaku, Azumino (JP)

(73) Assignee: SEIKO EPSON CORPORATION (JP)

( * ) Notice: Subject to any disclaimer, the term of this patent is extended or adjusted under 35 U.S.C. 154(b) by 246 days.

(21) Appl. No.: 17/956,179

(22) Filed: Sep. 29, 2022

(65) Prior Publication Data

US 2023/0099340 A1 Mar. 30, 2023

(30) Foreign Application Priority Data

Sep. 30, 2021 (JP) ................................ 2021-160950

(51) Int. Cl.
*B41J 2/14* (2006.01)
*B41J 2/16* (2006.01)

(52) U.S. Cl.
CPC ......... *B41J 2/1433* (2013.01); *B41J 2/14274* (2013.01); *B41J 2/1612* (2013.01); *B41J 2202/12* (2013.01)

(58) Field of Classification Search
CPC .... B41J 2/1433; B41J 2/14274; B41J 2/1612; B41J 2202/12; B41J 2002/14241; B41J 2002/14362; B41J 2002/14419; B41J 2202/20; B41J 2/14233
See application file for complete search history.

(56) References Cited

U.S. PATENT DOCUMENTS

2005/0057612 A1* 3/2005 Chikamoto .......... B41J 2/14209
347/68

FOREIGN PATENT DOCUMENTS

JP 2020-082412 A 6/2020

* cited by examiner

*Primary Examiner* — Bradley W Thies
(74) *Attorney, Agent, or Firm* — Harness, Dickey & Pierce, P.L.C.

(57) ABSTRACT

A liquid ejecting head includes a liquid flow channel including nozzles constituting a nozzle row configured to eject a liquid, a dummy flow channel including dummy nozzles constituting a dummy nozzle row not configured to eject liquid, and a closing section formed by an adhesive and closing the dummy flow channel.

18 Claims, 10 Drawing Sheets

LIQUID EJECTING HEAD AND LIQUID EJECTING APPARATUS

The present application is based on, and claims priority from JP Application Serial Number 2021-160950, filed Sep. 30, 2021, the disclosure of which is hereby incorporated by reference herein in its entirety.

BACKGROUND

1. Technical Field

The present disclosure relates to a liquid ejecting head and a liquid ejecting apparatus.

2. Related Art

As for a liquid ejecting head of a liquid ejecting apparatus such as a printer, JP-A-2020-82412 discloses a liquid ejecting head including a flow channel which is used for ejecting a liquid and a dummy flow channel which is not used for ejecting the liquid. The liquid ejecting head has a nozzle plate having a nozzle formed to communicate with the flow channel. The nozzle plate does not have a dummy nozzle formed to correspond to the dummy flow channel, and the dummy flow channel is closed by the nozzle plate.

There is a demand to manufacture a liquid ejecting head having the reduced number of nozzles used according to the specifications of the liquid ejecting apparatus at low cost. In this case, a part of the flow channel in the existing liquid ejecting head which does not include the dummy flow channel is diverted to the dummy flow channel, and the dummy flow channel is closed, which is conceivable. However, in JP-A-2020-82412, since a new nozzle plate having a portion in which a nozzle hole is not formed has to be manufactured in order to close the dummy flow channel, costs may be increased accordingly.

SUMMARY

According to a first aspect of the present disclosure, there is provided a liquid ejecting head. The liquid ejecting head includes a liquid flow channel including a plurality of nozzles constituting a nozzle row for ejecting a liquid, a dummy flow channel including a plurality of dummy nozzles constituting a dummy nozzle row for ejecting no liquid, and a closing section formed by an adhesive and closing the dummy flow channel.

According to a second aspect of the present disclosure, there is provided a liquid ejecting apparatus. The liquid ejecting apparatus includes the liquid ejecting head of the aspect, and a liquid storage section storing the liquid supplied to the liquid ejecting head.

DESCRIPTION OF EXEMPLARY EMBODIMENTS

A. First Embodiment

Figure 1:
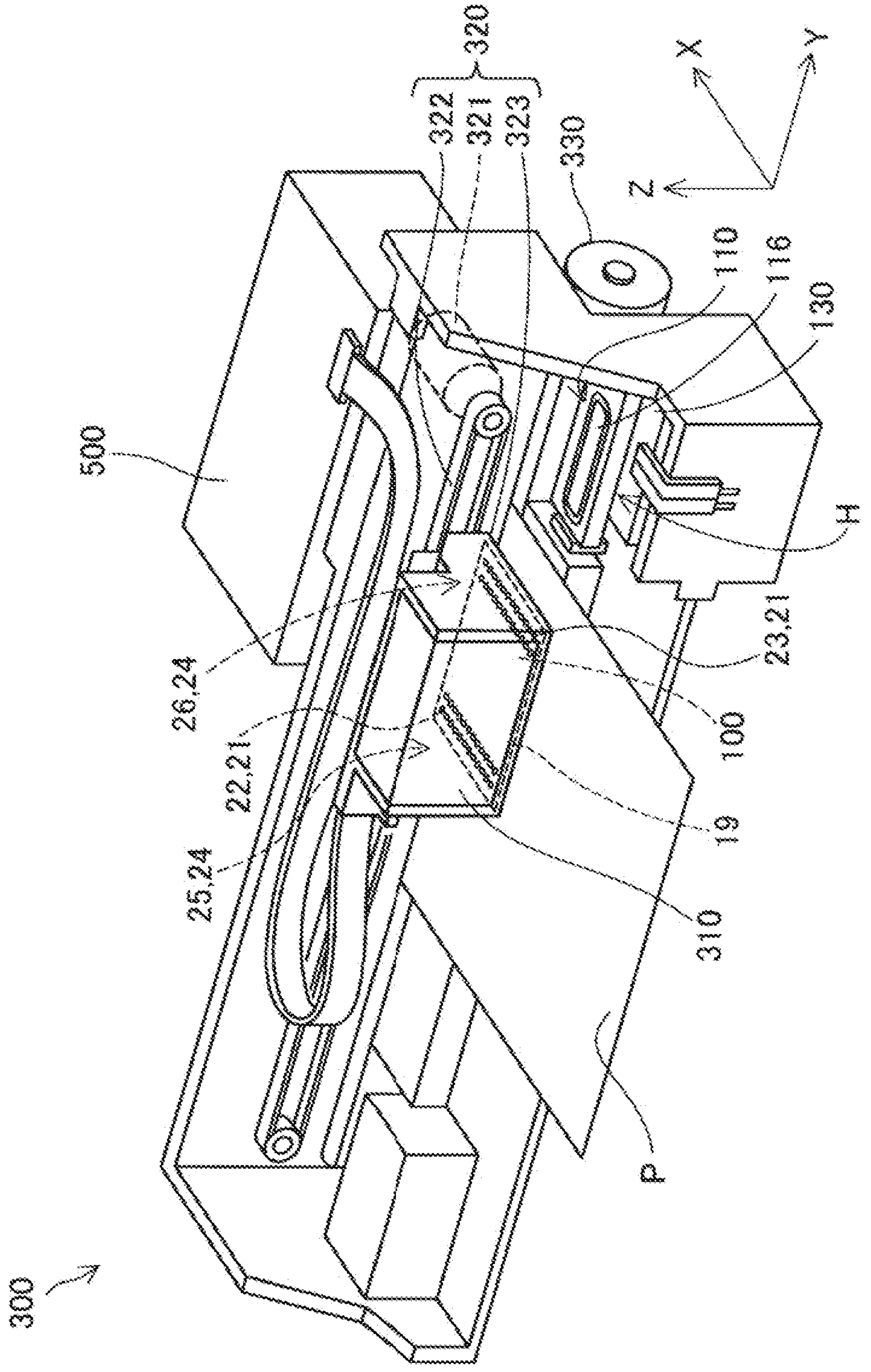
FIG. 1 is a schematic diagram illustrating a schematic configuration of a liquid ejecting apparatus.

FIG. 1 is a schematic diagram showing a schematic configuration of a liquid ejecting apparatus 300 including a liquid ejecting head 100 as a first embodiment of the present disclosure. In FIG. 1, respective arrows represent X, Y, and Z directions that are orthogonal to each other. The X direction, the Y direction, and the Z direction respectively denote directions along an X-axis, a Y-axis, and a Z-axis, which are three spatial axes orthogonal to each other, and have directions on one side and the other side along the X-axis, the Y-axis, and the Z-axis respectively. Specifically, positive directions along the X-axis, the Y-axis, and the Z-axis correspond to a +X direction, a +Y direction, and a +Z direction, respectively, and negative directions along the X-axis, the Y-axis, and the Z-axis correspond to a −X direction, a −Y direction, and a −Z direction, respectively. In FIG. 1, the directions from the base end to the tip end of each arrow indicating the X, Y, and Z directions are positive directions along the X-axis, Y-axis, and Z-axis, respectively. In FIG. 1, the X-axis and the Y-axis are axes along a horizontal plane and the Z-axis is an axis along a vertical line. Accordingly, in the present embodiment, the −Z direction denotes the direction of gravity. Also, in other drawings, the arrows represent the X direction, the Y direction, and the Z direction, as appropriate. The X, Y, and Z directions in FIG. 1 and the X, Y, and Z directions in other drawings represent the same directions. Hereinafter, the +Z direction is also referred to as "up", and the −Z direction is also referred to as "down". Here, "orthogonal" includes a range of 90°±10°.

The liquid ejecting apparatus 300 is an ink jet printer printing an image on a medium P by ejecting ink as a liquid. The liquid ejecting apparatus 300 prints the image on the medium P by ejecting the ink onto the medium P such as paper and forming dots at various positions on the medium P, based on print data representing a state of on/off of the dots in the medium P. As the medium P, in addition to the paper, a medium capable of holding a liquid, such as plastic, film, fiber, cloth, leather, metal, glass, wood, or ceramics, is used. As the liquid of the liquid ejecting apparatus 300, in addition to the ink, any liquid such as various coloring materials, electrode materials, samples such as bioorganic substances and inorganic substances, lubricating oils, resin liquids, and etching liquids is used.

The liquid ejecting apparatus 300 includes the liquid ejecting head 100 having a plurality of nozzle holes 21 formed therein, a cap 110, a suction pump 130, a liquid storage section 310, a head moving mechanism 320, a transport mechanism 330 that delivers the medium P, and a control section 500.

The liquid storage section 310 stores the ink ejected from the liquid ejecting head 100. A type of ink stored in the liquid storage section 310 may be one type or a plurality of types. As the liquid storage section 310, for example, a bag-shaped liquid pack formed of a flexible film, a cartridge that can be attached to and detached from the liquid ejecting apparatus 300, an ink tank, and the like are used. In the present embodiment, the liquid storage section 310 is mounted on a carriage 323 together with the liquid ejecting head 100.

The control section 500 includes a computer including one or more processors a main storage device, and an input/output interface that inputs and outputs a signal to and from the outside. The control section 500 controls each mechanism of the liquid ejecting apparatus 300 in accordance with the print data, thereby ejecting the ink onto the medium P from the liquid ejecting head 100 and printing an image on the medium P. That is, the control section 500 controls an ejection operation of the liquid ejecting head 100 for ejecting the liquid.

The head moving mechanism 320 includes a drive motor 321, a drive belt 322, and a carriage 323 accommodating the liquid ejecting head 100. The head moving mechanism 320 transmits a driving force of the drive motor 321 to the carriage 323 via the drive belt 322, and reciprocates the carriage 323 together with the liquid ejecting head 100 along a main scanning direction. In the present embodiment, the main scanning direction is a direction along the Y direction.

The liquid ejecting head 100 has a nozzle row 25 for ejecting the liquid, and a dummy nozzle row 26 for ejecting no liquid. The nozzle row 25 includes a plurality of nozzles 22. The nozzle 22 refers to one of the nozzle holes 21 that ejects the liquid. As illustrated in FIG. 1, in the present embodiment, one nozzle row 25 includes the plurality of nozzles 22 that are arranged along the X direction. The dummy nozzle row 26 includes a plurality of dummy nozzles 23. The dummy nozzle 23 refers to one of the nozzle holes 21 ejecting no liquid. One dummy nozzle row 26 includes the plurality of dummy nozzles 23 that are arranged along the X direction. Hereinafter, both the nozzle row 25 and the dummy nozzle row 26 are referred to as a nozzle hole row 24, without being distinguished.

An opening of the nozzle 22 and an opening of the dummy nozzle 23 are formed in an ejection surface 19 of the liquid ejecting head 100. In the present embodiment, the ejection surface 19 is formed by a lower surface of a nozzle plate 160 and a lower surface of a fixing plate 250, which will be illustrated later in FIG. 2 and the like.

The liquid ejecting head 100 ejects, through the nozzle 22 in a form of liquid droplets, the liquid supplied from the liquid storage section 310 onto the medium P transported along a sub-scanning direction intersecting the main scanning direction by the transport mechanism 330, while reciprocating the liquid ejecting head 100 in the main scanning direction by the head moving mechanism 320. In the present embodiment, the sub-scanning direction is a direction along the X direction orthogonal to the main scanning direction. In other embodiments, the main scanning direction and the sub-scanning direction may not have to be orthogonal to each other. Further, in the present embodiment, the liquid ejecting apparatus 300 is a serial printer in which the liquid ejecting head 100 is transported in the Y direction. However, in other embodiments, the liquid ejecting apparatus 300 may be a line printer to which the liquid ejecting head 100 is fixed and in which the nozzles 22 are arranged over the entire width of the medium P. The number of the liquid ejecting heads 100 provided in the liquid ejecting apparatus 300 may be one or two or more.

The cap 110 and the suction pump 130 are disposed at a home position H in a non-printing region, which is a region where the medium P is not disposed in the liquid ejecting apparatus 300. In the present embodiment, the cap 110 has a recessed shape opened toward the +Z direction. The cap 110 can move vertically by a cap moving mechanism (not illustrated). The cap 110 has a liquid absorbing material 116 disposed at a bottom in the opening. The liquid absorbing material 116 is made of, for example, a hydrophilic foam resin, and absorbs the liquid discharged from the nozzle 22 to the outside.

The cap 110 can cap the opening of the nozzle 22 and the opening of the dummy nozzle 23. The expression "cap" refers to that at least a part of the ejection surface 19 is covered to form a closed space to which the opening of the nozzle 22 and the opening of the dummy nozzle 23 are open between the ejection surface 19 and the cap 110. More specifically, the cap 110 is moved to the +Z direction toward the ejection surface 19 of the liquid ejecting head 100 positioned at the home position H by the cap moving mechanism, and an upper end portion of an edge of the cap 110 and the ejection surface 19 come into close contact with each other, thereby forming the closed space between the cap 110 and the ejection surface 19. As a result, the opening of the nozzle 22 and the opening of the dummy nozzle 23 are capped. Hereinafter, a state in which the opening of the nozzle 22 and the opening of the dummy nozzle 23 are capped may be referred to as a capped state.

The suction pump 130 sucks the liquid in the closed space formed by capping through a suction tube (not illustrated). The liquid sucked by the suction pump 130 is discharged to a waste liquid tank (not illustrated). When the image is printed on the medium P, the control section 500 drives the suction pump 130 and executes suction cleaning in accordance with a predetermined operation of a user or as appropriate. The suction cleaning refers to an operation of generating a negative pressure in the formed closed space and sucking the liquid together with air bubbles or foreign substances contained in the liquid from the liquid ejecting head 100 through the nozzle 22, in the capped state.

Figure 2:
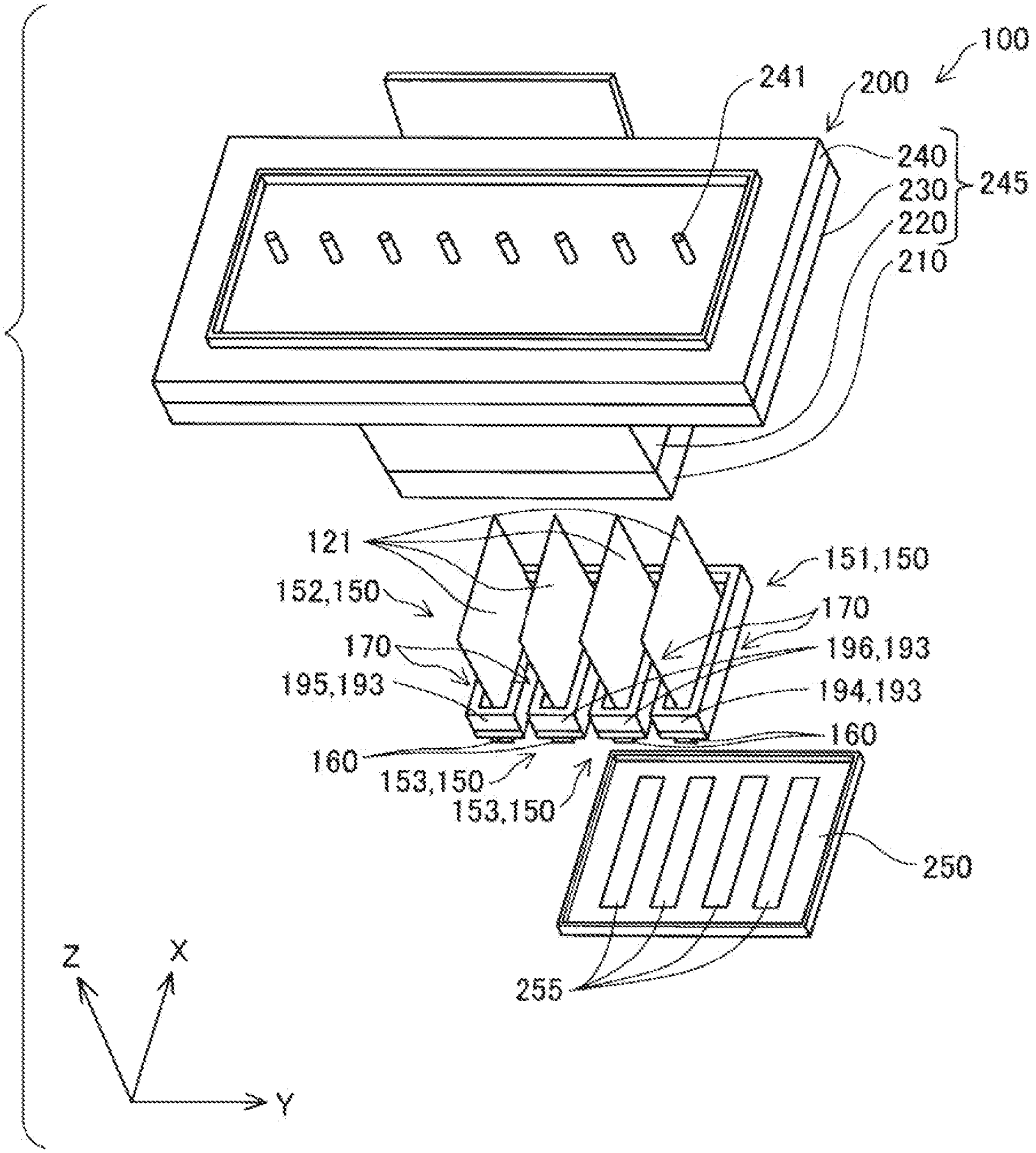
FIG. 2 is an exploded perspective view illustrating a schematic configuration of a liquid ejecting head.
Figure 3:
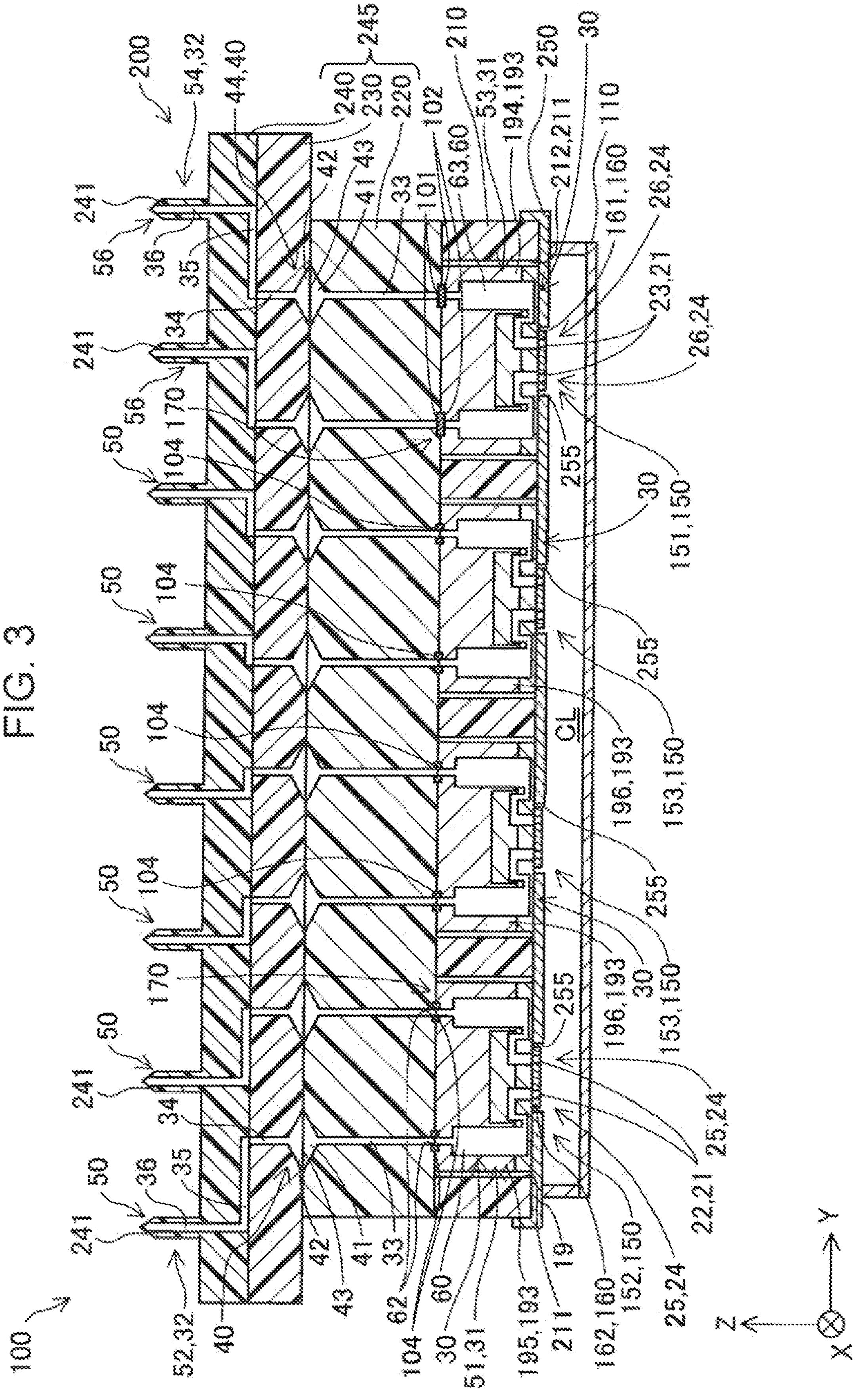
FIG. 3 is a cross-sectional view schematically illustrating a schematic configuration of the liquid ejecting head according to a first embodiment.

FIG. 2 is an exploded perspective view illustrating a schematic configuration of the liquid ejecting head 100. FIG. 3 is a cross-sectional view schematically illustrating a schematic configuration of the liquid ejecting head 100. In addition to the liquid ejecting head 100, FIG. 3 schematically illustrates the cap 110 described above and a closed space CL formed between the cap 110 and the ejection surface 19. The liquid ejecting head 100 in the present embodiment includes a plurality of head chips 150, a holder 200 holding the plurality of head chips 150, and the fixing plate 250.

As illustrated in FIG. 3, the liquid ejecting head 100 includes a liquid flow channel 50, a dummy flow channel 56, and a closing section 101. The liquid flow channel 50 refers to a flow channel including the plurality of nozzles 22 constituting the nozzle row 25. The liquid supplied from the liquid storage section 310 flows into the liquid flow channel 50. The dummy flow channel 56 refers to a flow channel including the plurality of dummy nozzles 23 constituting the dummy nozzle row 26. In the present embodiment, the liquid in the liquid storage section 310 is not supplied to the dummy flow channel 56. Therefore, the liquid does not flow into the dummy flow channel 56 in the present embodiment. In the present embodiment, the liquid ejecting head 100 includes six liquid flow channels 50 and two dummy flow channels 56, which are arranged along the Y direction, respectively. The two dummy flow channels 56 are disposed adjacent to each other, and disposed in the +Y direction with respect to the six liquid flow channels 50 arranged adjacent to each other.

The dummy flow channel 56 is closed by the closing section 101. The closing section 101 refers to a portion formed by an adhesive and closing the dummy flow channel 56. In the present embodiment, the closing section 101 is formed by a first adhesive section 102. The first adhesive section 102 refers to a portion formed by the adhesive and provided between a first flow channel member and a second flow channel member to bond the first flow channel member and the second flow channel member. The first flow channel member refers to a member formed with a first dummy portion 53 which is a part of the dummy flow channel 56. The second flow channel member refers to a member formed with a second dummy portion 54 which is a part of the dummy flow channel 56 and stacked on the first flow channel member. The second dummy portion 54 is an upstream portion of the dummy flow channel 56 from the first dummy portion 53. The upstream of the dummy flow channel 56 refers to a downstream of the dummy flow channel 56 opposite to the dummy nozzle row 26, and refers to a side of a coupling section 241 of the holder 200 (described later) in the present embodiment. That is, it can be said that the second dummy portion 54 is a portion of the dummy flow channel 56 that is farther from the dummy nozzle row 26 than the first dummy portion 53.

In the present embodiment, a first case section 194 of a first head chip 151 (described later) corresponds to the first flow channel member, and a flow channel forming section 245 of the holder 200 (described later) corresponds to the second flow channel member. The first case section 194 is formed with two first dummy portions 53 which are parts of the respective two dummy flow channels 56. The flow channel forming section 245 stacked on the first case section 194 is formed with two second dummy portion 54 which are parts of the respective two dummy flow channels 56. In the present embodiment, each of two first adhesive sections 102 is provided between the first case section 194 and the flow channel forming section 245. The first adhesive section 102 forms the closing section 101 between the first dummy portion 53 formed on the first case section 194 and the second dummy portion 54 formed in the flow channel forming section 245 to close the dummy flow channel 56. In the present embodiment, the first adhesive section 102 and the closing section 101 are formed of a silicone-based adhesive. In other embodiments, the first adhesive section 102 or the closing section 101 may be formed of another adhesive such as an epoxy-based adhesive.

Hereinafter, a direction in which the second flow channel member is stacked on the first flow channel member may be referred to as a stacking direction. In the present embodiment, a direction in which the flow channel forming section 245 is stacked on the first case section 194 corresponds to the stacking direction. The stacking direction has two directions, one direction along the same axis and the other direction opposite thereto, and is a direction along the Z direction in the present embodiment.

In the present embodiment, the second flow channel member is also stacked in a third flow channel member in addition to the first flow channel member. The third flow channel member refers to a member on which a first portion 51, which is a part of the liquid flow channel 50, is formed. In the present embodiment, the second flow channel member is formed with a second portion 52, which is a part of the liquid flow channel 50, in addition to the second dummy portion 54. The second portion 52 is a part of the liquid flow channel 50, which refers to a portion of the liquid flow channel 50 that is farther from the nozzle row 25 than the first portion 51. A third adhesive section 104 is provided between the second flow channel member and the third flow channel member. The third adhesive section 104 refers to a portion formed by the adhesive and provided between the second flow channel member and the third flow channel member to bond the second flow channel member and the third flow channel member. The third adhesive section 104 forms a second coupling flow channel 62 coupling the first portion 51 and the second portion 52. In the present embodiment, the third adhesive section 104 is formed of a silicone-based adhesive, like the first adhesive section 102. In other embodiments, the third adhesive section 104 may be formed of, for example, an epoxy-based adhesive.

In the present embodiment, the second case section 195 of a second head chip 152 to be described later, and the respective third case sections 196 of two third head chips 153 correspond to the third flow channel member. Two first portions 51 of the liquid flow channel 50 are formed for each between the second case section 195 and the two third case sections 196, respectively. The flow channel forming section 245 is formed with six second portions 52 in total. In the present embodiment, two third adhesive sections 104 are provided for each between the second case section 195 and the flow channel forming section 245, and between each third case section 196 and the flow channel forming section 245, six in total. The third adhesive section 104 forms the second coupling flow channel 62 that couples the first portion 51 formed between the second case section 195 and the two third case sections 196 and the second portion 52 formed on the flow channel forming section 245.

As illustrated in FIGS. 2 and 3, the liquid ejecting head 100 in the present embodiment includes four head chips 150 arranged along the Y direction. The first head chip 151 refers to the head chip 150 positioned closest to the +Y direction among the four head chips 150. The second head chip 152 refers to the head chip 150 positioned closest to the −Y direction. The third head chip 153 refers to each of the two head chips 150 disposed between the first head chip 151 and the second head chip 152. In the present embodiment, a configuration of the third head chip 153 is the same as that of the second head chip 152. Hereinafter, the first head chip 151, the second head chip 152, and the third head chip 153 are simply referred to as the head chip 150, without being distinguished.

Each head chip 150 has a common structure, which has a wiring substrate 121, the nozzle plate 160, and a chip main body 170. The chip main body 170 has a case section 193. In FIG. 3, the wiring substrate 121 is not illustrated. In addition, FIGS. 2 and 3 illustrate a simplified configuration of the chip main body 170. The first case section 194 refers to the case section 193 of the first head chip 151. Similarly, the second case section 195 and the third case section 196 refer to the case section 193 of the second head chip 152 and the case section 193 of the third head chip 153, respectively.

The nozzle plate 160 in the present embodiment is formed of a silicon single crystal substrate and has a long plate shape in the X direction. In other embodiment, the nozzle plate 160 may be formed of, for example, a metal material such as stainless steel or a resin material such as a polyimide resin. The nozzle plate 160 is fixed to a lower surface of the chip main body 170 via the adhesive. Hereinafter, the nozzle plate 160 provided on the first head chip 151 may be referred to as a first nozzle plate 161. The nozzle plate 160 provided on the second head chip 152 may be referred to as a second nozzle plate 162.

As illustrated in FIG. 3, each nozzle plate 160 is formed with at least one of the nozzle row 25 and the dummy nozzle row 26. In the present embodiment, one liquid flow channel 50 or one dummy flow channel 56 is provided with one nozzle hole row 24. More specifically, the first nozzle plate 161 is formed with only two adjacent dummy nozzle rows 26 corresponding to the two first dummy portions 53 formed on the first case section 194. The second nozzle plate 162 is formed with only two adjacent nozzle rows 25 corresponding to the two first portions 51 formed in the second case section 195. Further, since as described above, the configuration of the third head chip 153 is the same as that of the second head chip 152 in the present embodiment, only two adjacent nozzle rows 25 are also formed on the nozzle plate 160 provided on each third head chip 153, like the second nozzle plate 162. Accordingly, in the present embodiment, the total number of rows of the nozzle row 25 and the dummy nozzle row 26 formed on each nozzle plate 160 is the common number of rows, each of which is two.

Two first flow channels 31 are formed for each case section 193. The first flow channel 31 formed in the first case section 194 corresponds to the first dummy portion 53. The first flow channel 31 formed between the second case section 195 and the third case section 196 corresponds to the first portion 51. In the present embodiment, the first dummy portion 53 and the first portion 51 have the same structure. Hereinafter, both the first dummy portion 53 and the first portion 51 are simply referred to as the first flow channel 31, without being distinguished. Details of the configurations of the chip main body 170 and the first flow channel 31 will be described later.

In the present embodiment, the holder 200 holds the four head chips 150. The holder 200 has a first layer 210 and the flow channel forming section 245. In the present embodiment, the flow channel forming section 245 has a second layer 220, a third layer 230, and a fourth layer 240. In other embodiments, the holder 200 may be formed of a single member, or may be formed by stacking two, three, or five or more members. For example, the first layer 210 and the second layer 220 may be integrally formed.

The first layer 210, the second layer 220, the third layer 230, and the fourth layer 240 are stacked in this order from the bottom. The first layer 210 and each layer constituting the flow channel forming section 245 are formed of, for example, a resin material such as Zylon (registered trademark) or liquid crystal polymer. The first layer 210 and each layer constituting the flow channel forming section 245 may be formed of metals such as stainless steel, titanium, and aluminum or ceramics. In the present embodiment, a space between the first layer 210 and the flow channel forming section 245 and a space between each layer constituting the flow channel forming section 245 are bonded with the silicone-based adhesive. In other embodiments, these members may be bonded by, for example, the epoxy-based adhesive, or fixed to each other by screws or clamps.

Four accommodation spaces 211 are formed in the first layer 210. The accommodation space 211 is a space formed to penetrate the first layer 210 in the Z direction, and accommodates the four head chips 150 therein.

Hereinafter, the accommodation space 211 in which the first head chip 151 is accommodated is particularly referred to as a first accommodation space 212. In the present embodiment, the first accommodation space 212 is positioned closest to the +Y direction among the four accommodation spaces 211.

In the present embodiment, the flow channel forming section 245 is formed with eight second flow channels 32 arranged along the Y direction, corresponding to the total eight first flow channels 31. In the present embodiment, among the eight second flow channels 32, two second flow channels 32 positioned closest to the +Y direction correspond to the second dummy portions 54, respectively. In addition, the second flow channels 32 except for the second flow channel 32 corresponding to the second dummy portion 54 correspond to the second portions 52, respectively. Hereinafter, both the second dummy portion 54 and the second portion 52 are simply referred to as the second flow channel 32, without being distinguished. A flow channel length or flow channel cross-sectional area of each second flow channel 32 may be the same as or different from each other.

The second layer 220 is stacked on an upper surface of the first layer 210 and an upper surface of the case section 193 of each head chip 150 accommodated in the accommodation space 211. The second layer 220 is formed with a first holder flow channel 33 that is a part of the second flow channel 32 and communicates with the first flow channel 31. In the present embodiment, the second layer 220 is formed with eight first holder flow channels 33 communicating with the eight first flow channels 31, respectively. The first holder flow channel 33 is formed to extend along the Z direction, which is the stacking direction. A first space 41 is formed at an end portion of each first holder flow channel 33 on a side far from the first flow channel 31, that is, an upper end portion of the first holder flow channel 33. The first space 41 has a flow channel cross-sectional area larger than a portion of the first holder flow channel 33 excluding the first space 41, and is open toward each second space 42 formed in third layer 230 to be described later.

Each first adhesive section 102 is provided between the first case section 194 and the second layer 220 to bond the first case section 194 and the second layer 220. Each third adhesive section 104 is provided between the second case section 195, each third case section 196, and the second layer 220 to bond the second case section 195, each third case section 196, and the second layer 220. The first head chip 151 and the second layer 220 may be fixed to each other by, for example, other adhesive sections formed by the adhesive, screws, or clamps, in addition to the first adhesive section 102. Similarly, the second head chip 152 or the third head chip 153 and the second layer 220 may be fixed to each other by other adhesive sections, screws, or clamps, in addition to the third adhesive section 104. Each adhesive section, such as the first adhesive section 102, the third adhesive section 104, and other adhesive sections may be integrally formed.

The third layer 230 is stacked on an upper surface of the second layer 220. The third layer 230 is formed with a second holder flow channel 34 that is a part of the second flow channel 32 and communicates with the first holder flow channel 33. In the present embodiment, the third layer 230 is formed with eight second holder flow channels 34 communicating with the eight first holder flow channel 33, respectively. The second holder flow channel 34 is formed to extend along the Z direction, which is the stacking direction. A second space 42 is formed at an end portion of each second holder flow channel 34 on a side close to the first holder flow channel 33, that is, a lower end portion of the second holder flow channel 34. The second space 42 has a flow channel cross-sectional area larger than other portions of the second holder flow channel 34 excluding the second space 42, and is open toward each first space 41.

A filter chamber 40 is formed by the first space 41 and the second space 42. The filter chamber 40 is provided with a filter 43 for removing air bubbles and foreign substances contained in the liquid. The filter 43 is disposed between the first space 41 and the second space 42 so as to cover an opening of the first space 41 and an opening of the second space 42. The liquid flowing in the liquid flow channel 50 passes through the filter 43 in the filter chamber 40 to remove the air bubbles or foreign substances. In the present embodiment, the liquid does not flow into the filter chamber 40 formed in the dummy flow channel 56. Hereinafter, the filter chamber 40 formed in the dummy flow channel 56 may be referred to as a dummy filter chamber 44. In the present embodiment, the dummy filter chamber 44 is disposed upstream of the dummy flow channel 56 from the closing section 101.

The fourth layer 240 is stacked on an upper surface of the third layer 230. The fourth layer 240 has a coupling section 241. In the present embodiment, the coupling section 241 is formed in a needle shape protruding in the +Z direction. In addition, the fourth layer 240 is formed with a third holder flow channel 35 communicating with the second holder flow channel 34 and a fourth holder flow channel 36 communicating with the third holder flow channel 35, each of the third holder flow channel 35 and the fourth holder flow channel 36 being a part of the second flow channel 32. In the present embodiment, the fourth layer 240 is formed with eight third holder flow channels 35 each communicating with the eight second holder flow channels 34 and eight fourth holder flow channels 36 each communicating with the eight third holder flow channels 35. The fourth holder flow channel 36 is formed to extend from a tip end of the coupling section 241 toward a lower surface of the third layer 230 along the Z direction, which is the stacking direction. The third holder flow channel 35 is formed to extend along a direction perpendicular to the Z direction, which is the stacking direction, and allows the fourth holder flow channel 36 and the second holder flow channel 34 to communicate with each other. In the present embodiment, the third holder flow channel 35 is formed to extend along the Y direction. In other embodiments, the second flow channel 32 may not be formed by, for example, the first holder flow channel 33 to the fourth holder flow channel 36, and may be formed as a flow channel of other aspects.

The coupling section 241 is configured to couple the liquid storage section 310. The liquid storage section 310 may be directly coupled to the coupling section 241, or indirectly coupled to the coupling section 241 through a tube or the like when the liquid storage section 310 is not mounted on the carriage 323, for example. For example, an unevenness for positioning the liquid storage section 310 or the tube is formed on an upper surface of the coupling section 241. The liquid in the liquid storage section 310 coupled to the coupling section 241 flows into the liquid ejecting head 100 through the fourth holder flow channel 36, and is supplied to the liquid flow channel 50 in the liquid ejecting head 100. In the present embodiment, among the coupling sections 241, two coupling sections 241 corresponding to the dummy flow channels 56 are not coupled to the liquid storage section 310.

In the present embodiment, the fixing plate 250 is formed of stainless steel. The fixing plate 250 is formed with four openings 255 arranged along the Y direction so as to correspond to the respective head chips 150. The fixing plate 250 is fixed to the lower surface of the holder 200 and the lower surface of each head chip 150 via the adhesive so that each nozzle plate 160 is positioned in each opening 255, when viewed along the Z direction. As a result, the lower surface of the nozzle plate 160 and each nozzle hole row 24 are exposed downward through the opening 255. As described above, in the present embodiment, the lower surface of the nozzle plate 160 and the lower surface of the fixing plate 250 form the ejection surface 19.

Figure 4:
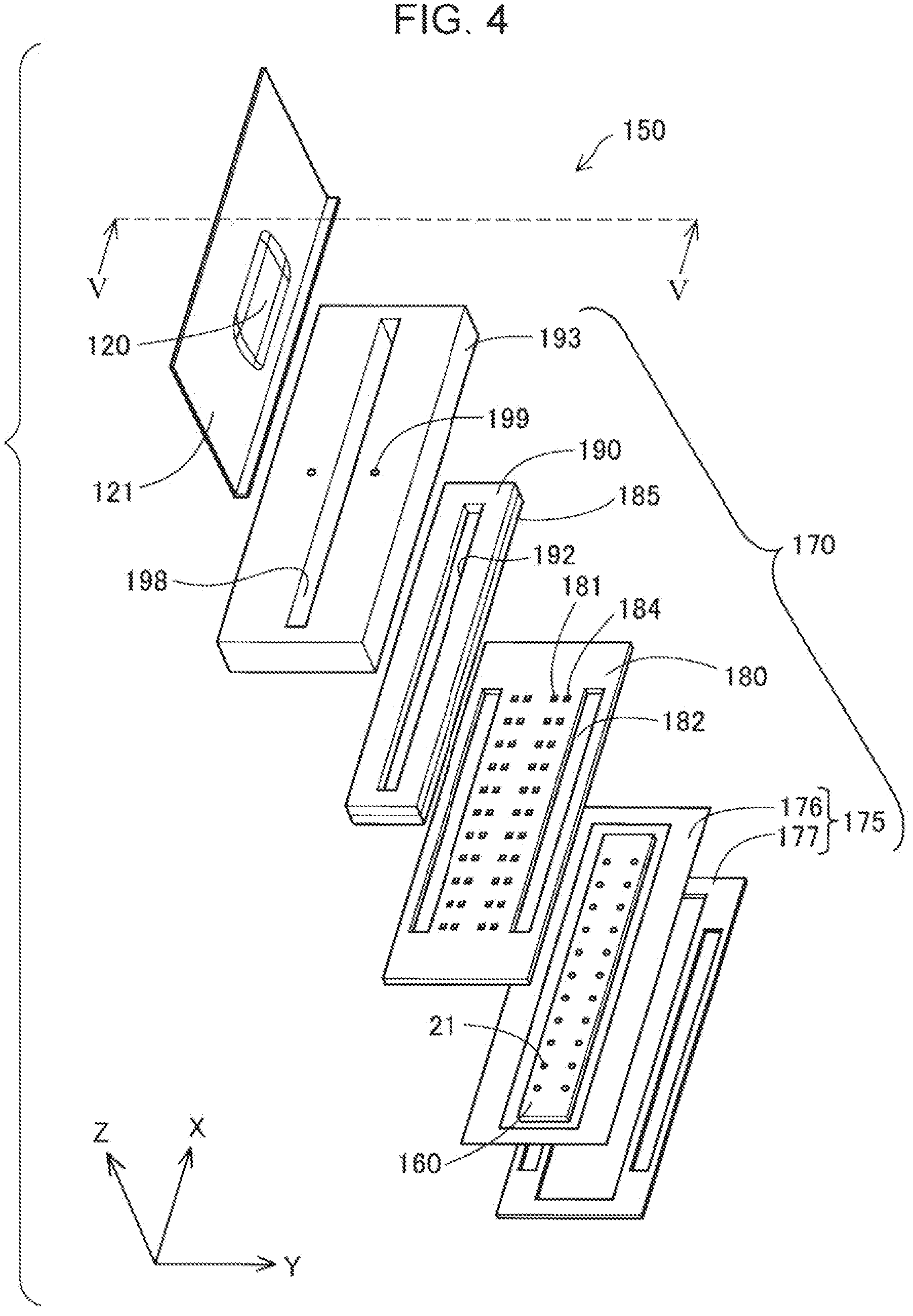
FIG. 4 is an exploded perspective view illustrating a configuration of a head chip.
Figure 5:
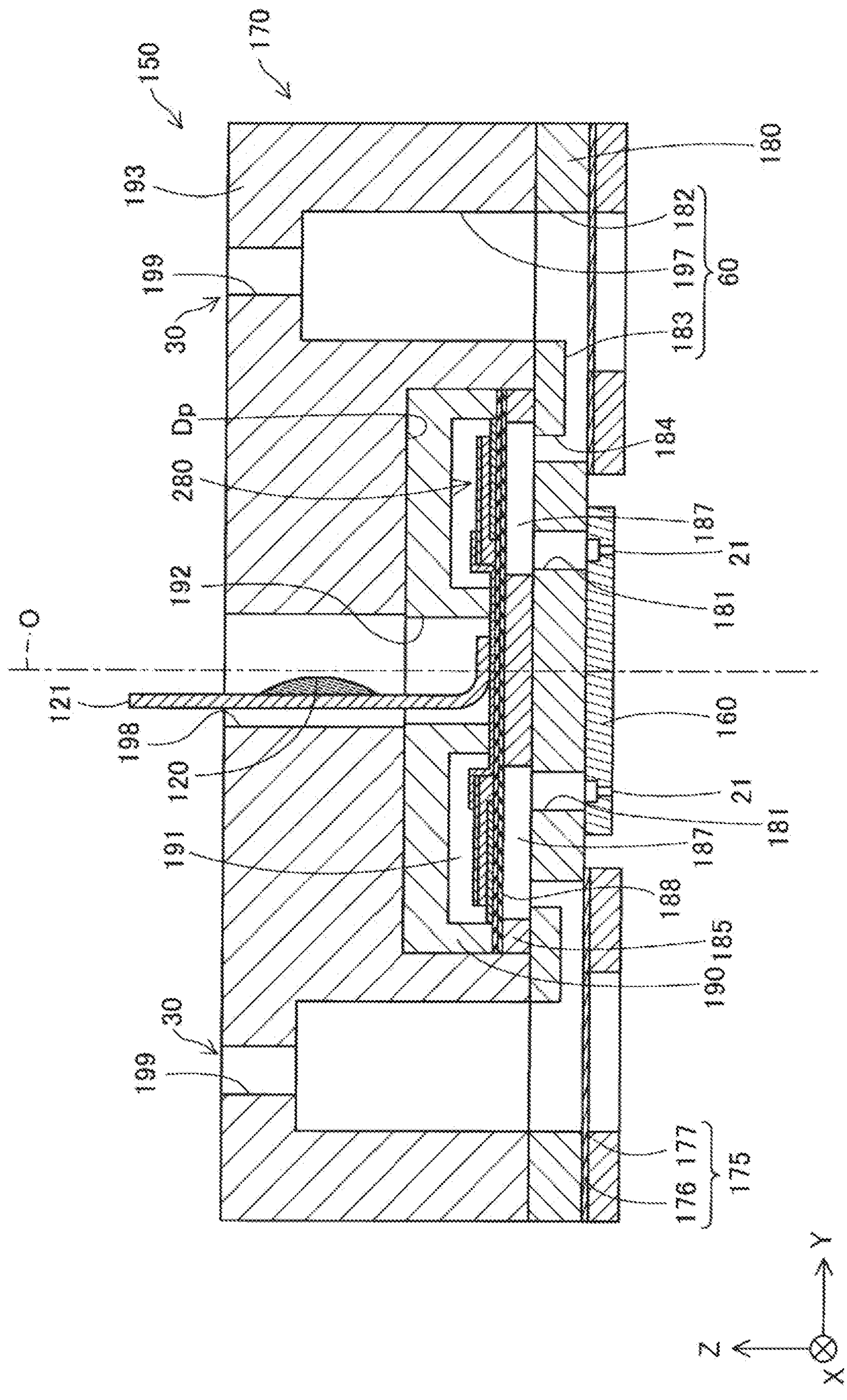
FIG. 5 is a cross-sectional view of the head chip, taken along line V-V in FIG. 4.

FIG. 4 is an exploded perspective view illustrating a configuration of the head chip 150. FIG. 5 is a cross-sectional view of the head chip 150, taken along line V-V in FIG. 4. As illustrated in FIGS. 4 and 5, the nozzle plate 160 of the head chip 150 and the chip main body 170 are stacked in this order from the bottom along the Z direction. The chip main body 170 is formed by stacking a compliance substrate 175, a communication plate 180, a flow channel forming substrate 185, a protective substrate 190, and the case section 193 in this order from the bottom along the Z direction. As illustrated in FIG. 5, the nozzle plate 160 and the chip main body 170 in the present embodiment are formed to be plane-symmetrical with a central plane O interposed therebetween in the Y direction.

As illustrated in FIG. 5, in the present embodiment, two chip flow channels 30 are formed in the head chip 150. In the present embodiment, the chip flow channel 30 includes the nozzle hole row 24, a nozzle communication passage 181, a pressure generating chamber 187, a supply communication passage 184, a second manifold section 183, a first manifold section 182, a liquid chamber section 197, and a coupling port 199, which are formed to be coupled in this order. In the present embodiment, the liquid chamber section 197 and the coupling port 199 are formed in the case section 193 and form the first flow channel 31. That is, the liquid chamber section 197 and the coupling port 199 in the first head chip 151 correspond to the first dummy portion 53, and the nozzle hole row 24, the nozzle communication passage 181, the pressure generating chamber 187, the supply communication passage 184, the second manifold section 183, and the first manifold section 182 correspond to a portion of the dummy flow channel 56 downstream from the first dummy portion 53. In addition, the liquid chamber section 197 and the coupling port 199 in the second head chip 152 and the third head chip 153 correspond to the first portion 51, and the nozzle hole row 24, the nozzle communication passage 181, the pressure generating chamber 187, the supply communication passage 184, the second manifold section 183, and the first manifold section 182 correspond to a portion of the liquid flow channel 50 close to the nozzle row 25 from the first portion 51.

In the present embodiment, the flow channel forming substrate 185 is a plate-shaped member formed of a silicon single crystal substrate. The flow channel forming substrate 185 is formed by anisotropic etching from one side so that the pressure generating chambers 187 partitioned by a plurality of walls are arranged along the X direction. In the present embodiment, the flow channel forming substrate 185 is provided with a total of two rows that are formed of the plurality of pressure generating chambers 187 arranged along the X direction, with the central plane O interposed between the two rows in the Y direction. In other embodiments, the flow channel forming substrate 185 may be formed of, for example, a metal such as stainless steel (SUS) or nickel (Ni), a ceramic material such as zirconia ($ZrO_2$) or alumina ($Al_2O_3$), a glass ceramic material, or an oxide such as magnesium oxide (MgO) or lanthanum aluminic acid ($LaAlO_3$).

In the present embodiment, the communication plate 180 is a plate-shaped member formed of a silicon single crystal substrate. In other embodiments, the communication plate 180 may be formed of, for example, a metal such as stainless steel or nickel, or a ceramic such as zirconia. As illustrated in FIG. 5, the communication plate 180 is provided with the nozzle communication passage 181, the first manifold section 182, the second manifold section 183, and the supply communication passage 184 in pairs with the central plane O interposed therebetween. Hereinafter, a set of the dummy nozzle 23 constituting the dummy nozzle row 26, and the nozzle communication passage 181, the pressure generating chamber 187, and the supply communication passage 184 which communicate with the dummy nozzle 23 may be referred to as a dummy individual flow channel.

The first manifold section 182 and the second manifold section 183 are commonly provided in a plurality of pressure generating chambers 187 constituting one row, and form a common liquid chamber section 60 as a part of the chip flow channel 30 together with the liquid chamber section 197 of the case section 193. A plurality of nozzle communication passages 181 and a plurality of supply communication passages 184 are provided so that they correspond to the pressure generating chambers 187, respectively and are arranged along the X direction.

The nozzle communication passage 181 allows the pressure generating chamber 187 and the nozzle hole 21 to communicate with each other in the Z direction. The supply communication passage 184 allows the common liquid chamber section 60 and the pressure generating chamber 187 to communicate with each other in the Z direction. That is, the common liquid chamber section 60 of the second head chip 152 communicates with the plurality of nozzles 22 constituting the nozzle row 25 through the supply communication passage 184, the pressure generating chamber 187, and the nozzle communication passage 181. Similarly, the common liquid chamber section 60 of the first head chip 151 communicates with the plurality of dummy nozzles 23 constituting the dummy nozzle row 26. Hereinafter, the common liquid chamber section 60 communicating with the plurality of dummy nozzles 23 constituting the dummy nozzle row 26, such as the common liquid chamber section 60 of the first head chip 151, is referred to as a dummy common liquid chamber 63. As illustrated in FIG. 3, in the present embodiment, the closing section 101 is disposed upstream from the dummy common liquid chamber 63. Further, in the present embodiment, a part of the dummy common liquid chamber 63 is defined by the first case section 194 corresponding to the first flow channel member.

The compliance substrate 175 is bonded to a surface of the communication plate 180 on the −Z direction side via the adhesive. In the present embodiment, the compliance substrate 175 includes a sealing film 176 formed of a thin film having flexibility and a plate-shaped frame member 177 formed of a hard material such as metal. As illustrated in FIGS. 4 and 5, an opening penetrating each of the sealing film 176 and the frame member 177 in the Z direction is provided at a portion of a central portion of the sealing film 176 and the frame member 177, overlapping with the nozzle plate 160, when viewed along the Z direction. Furthermore, the frame member 177 also has an opening that penetrates the frame member 177 in the Z direction at a position where the frame member 177 overlaps with the first manifold section 182 when viewed along the Z direction. Therefore, the lower surface of each first manifold section 182 is sealed only with the sealing film 176.

A vibration plate 188 is disposed on a surface of the flow channel forming substrate 185 on the +Z direction side. In the present embodiment, the vibration plate 188 includes an elastic film formed of silica ($SiO_2$) and an insulator film formed of zirconia provided on the elastic film. A surface of the elastic film of the vibration plate 188 on the −Z direction side constitutes the wall surface of the pressure generating chamber 187 on the +Z direction side.

A piezoelectric actuator 280 is disposed on the surface of the vibration plate 188 on the +Z direction side. The piezoelectric actuator 280 is formed by stacking a first electrode, a piezoelectric layer, and a second electrode. In the present embodiment, the first electrode and the second electrode are formed of platinum. The piezoelectric layer in the present embodiment is formed of lead zirconate titanate (PZT). The piezoelectric actuator 280 vibrates the vibration plate 188 by piezoelectric distortion of the piezoelectric layer caused by applying a voltage to both electrodes from a drive circuit 120 disposed on the wiring substrate 121. The vibration of the vibration plate 188 provided to correspond to the pressure generating chamber 187 of the liquid flow channel 50, that is, the vibration of the vibration plate 188 of the second head chip 152 and the third head chip 153 in the present embodiment causes a pressure change in the liquid in the pressure generating chamber 187. The pressure change causes the liquid to reach the nozzle 22 through the nozzle communication passage 181 and eject the liquid from the nozzle 22.

In other embodiments, the first electrode or second electrode of the piezoelectric actuator 280 may be formed of, for example, various metals such as platinum, iridium, titanium, tungsten, and tantalum, and a conductive metal oxide such as lanthanum nickelate ($LaNiO_3$). Instead of PZT, the piezoelectric layer may be formed of other types of ceramic materials having a so-called perovskite structure represented by $ABO_3$ type, such as barium titanate, lead titanate, potassium niobate, lithium niobate, lithium tantalate, sodium tungstate, zinc oxide, barium strontium titanate (BST), strontium bismuth tantalate (SBT), lead metaniobate, lead zinc niobate, and lead scandium niobate. In addition, the piezoelectric layer is not limited to the ceramic materials, and may be formed of any materials having a piezoelectric effect, such as polyvinylidene fluoride and quartz.

The protective substrate 190 is bonded to a surface of the flow channel forming substrate 185 on the piezoelectric actuator 280 side. The protective substrate 190 has substantially the same area as the flow channel forming substrate 185 when viewed along the Z direction. The protective substrate 190 has a through-hole 192 and a pair of holding sections 191 provided with the central plane O interposed therebetween. The through-hole 192 is a hole that penetrates the protective substrate 190 in the Z direction. The wiring substrate 121 is inserted into the through-hole 192. The holding section 191 is a depression provided on the −Z direction side of the protective substrate 190, and is open toward the −Z direction. The piezoelectric actuator 280 is disposed in the opening of the holding section 191.

The case section 193 is formed of, for example, a material such as resin or metal. As illustrated in FIGS. 4 and 5, the case section 193 is a portion constituting an upper surface of the chip main body 170, and is a portion bonded to the second layer 220 of the flow channel forming section 245 via the first adhesive section 102, the third adhesive section 104, or the like. The case section 193 is stacked on both of the communication plate 180 and the protective substrate 190, and bonded to both of the communication plate 180 and the protective substrate 190 via the adhesive. More specifically, the case section 193 has a depression Dp formed on the lower surface thereof and capable of accommodating the flow channel forming substrate 185 and the protective substrate 190, and is stacked on the communication plate 180 and the protective substrate 190, while accommodating the flow channel forming substrate 185 and the protective substrate 190 in the depression Dp.

The case section 193 is provided with the liquid chamber section 197, an insertion port 198, and the coupling port 199. A pair of the liquid chamber section 197 and the coupling port 199 are respectively provided with the central plane O interposed therebetween. The coupling port 199 is a portion constituting an end portion of the chip flow channel 30 on a side far from the nozzle hole row 24. In the present embodiment, the coupling port 199 is open in the +Z direction. The liquid chamber section 197 communicates with the second flow channel 32 formed in the holder 200 in the Z direction, which is the stacking direction, through the coupling port 199. As described above, the liquid chamber section 197 is a portion forming the common liquid chamber section 60 together with the first manifold section 182 and the second manifold section 183. The insertion port 198 is a hole that penetrates the case section 193 in the Z direction and communicates with the through-hole 192 of the protective substrate 190. The wiring substrate 121 is inserted into the through-hole 192 through the insertion port 198, and coupled to the piezoelectric actuator 280.

In the present embodiment, the first adhesive section 102 is formed by the adhesive that is applied between an opening of each coupling port 199 in the first case section 194 and an opening of each first holder flow channel 33 on the head chip 150 side corresponding to each coupling port 199 and formed in the holder 200. The first adhesive section 102 forms the closing section 101 that closes the opening of the coupling port 199 in the first case section 194 and the opening of the first holder flow channel 33. Therefore, in the present embodiment, the closing section 101 is formed by the coupling port 199 and the first holder flow channel 33, and is provided at a portion of the dummy flow channel 56 extending along the Z direction, which is the stacking direction. In the present embodiment, for example, when the second layer 220 is stacked on the first case section 194 to bond the second layer 220 and the first case section 194 to each other, the closing section 101 and the first adhesive section 102 are formed by applying the adhesive between the second layer 220 and the first case section 194 so that the opening of the coupling port 199 and the opening of the first holder flow channel 33 overlap each other, when viewed along the Z direction which is the stacking direction.

Further, the third adhesive section 104 is formed by the adhesive that is applied between an edge of the opening of each coupling port 199 in the second case section 195 and the third case section 196 and an edge of the opening of each first holder flow channel 33 on the head chip 150 side corresponding to each coupling port 199, formed in the holder 200. The third adhesive section 104 formed the second coupling flow channel 62 that liquid-tightly couples the opening of the coupling port 199 formed in the second case section 195 or the third case section 196 and the opening of the first holder flow channel 33. In the present embodiment, for example, when the second layer 220 is stacked on the second case section 195 or the third case section 196 to bond the second layer 220 and the second case section 195 or the third case section 196 to each other, the third adhesive section 104 and the second coupling flow channel 62 are formed by applying the adhesive between the second layer 220 and the second case section 195 or the third case section 196 so as to surround the opening of the coupling port 199 and the opening of the first holder flow channel 33, when viewed along the Z direction which is the stacking direction.

In the present embodiment, the coupling port 199 in the second case section 195 corresponding to the third flow channel member functions as an inlet for introducing the liquid supplied from the liquid storage section 310 to the liquid ejecting head 100 into the chip main body 170 via the second portion 52 and the second coupling flow channel 62. In addition, the liquid is supplied to the common liquid chamber section 60 of the second head chip 152 through the coupling port 199. On the other hand, in the present embodiment, the liquid is not supplied to the dummy flow channel 56 as described above. Therefore, no liquid flows into the coupling port 199 and the common liquid chamber section 60 in the first head chip 151.

Reducing the number of head chips 150 itself is considered as another method for manufacturing the liquid ejecting head having the reduced number of used nozzle rows 25. As described above, in the present embodiment, the number of rows of the dummy nozzle row 26 in the entire liquid ejecting head 100 is two, which is the common number of rows or more described above. Therefore, like the first head chip 151, it is possible to constitute the head chip 150 in which no nozzle row 25 is formed and only the dummy nozzle row 26 is formed. However, it is also considered to reduce the number of head chips 150 by not providing the head chip 150 as described above. However, for example, when the number of first head chips 151 is reduced, the fixing plate 250 is not fixed to the head chip 150 in the vicinity of the first accommodation space 212. Therefore, deformation such as dents may easily occur at a portion of the fixing plate 250 positioned in the vicinity of the first accommodation space 212, for example, due to an external force caused by collision of the medium P in transport jam or a negative pressure by suction cleaning, as compared with a portion of the fixing plate 250 positioned in the vicinity of another accommodation space 211. Further, when the number of first head chips 151 is reduced, because the first accommodation space 212 is formed with a space having a volume corresponding to the volume of the first head chip 151, a negative pressure generated in the closed space CL acts on the first accommodation space 212 in the suction cleaning performed in a capped state by the cap 110 so that air outside the liquid ejecting head is drawn via the coupling section 241 that is open to the atmosphere. Therefore, the liquid cannot be appropriately sucked from the second head chip 152 or the third head chip 153, and an effect of the suction cleaning may thus be deteriorated. Therefore, when the number of first head chip 151 is reduced, for example, a new cap, which only covers the second head chip 152 and the third head chip 153 and does not cover the first accommodation space 212 is required so that the negative pressure by the suction cleaning does not act on the first accommodation space 212 or the fixing plate in which the opening 255 corresponding to the first accommodation space 212 is not formed. Thus, this leads to an increase in manufacturing costs. In the present embodiment, the liquid ejecting head 100 includes the first head chip 151 the closing section 101 closing the dummy flow channel 56, such that it is possible to suppress deformation of the fixing plate 250 or deterioration of the effect of the suction cleaning, even when the fixing plate 250 or the cap 110 is used.

Figure 6:
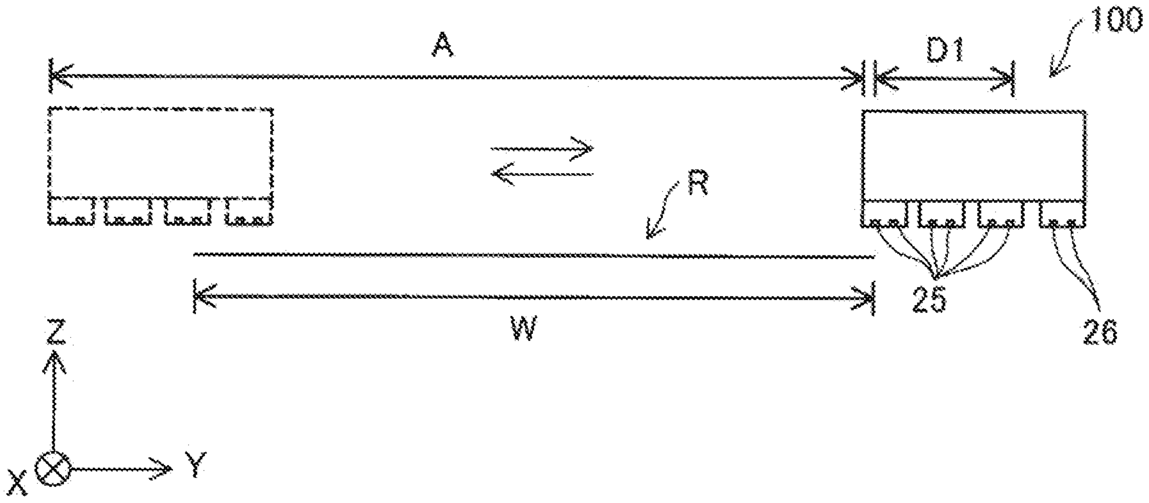
FIG. 6 is a schematic diagram illustrating scanning of the liquid ejecting head.

FIG. 6 is a schematic diagram illustrating scanning of the liquid ejecting head 100 in the present embodiment. As illustrated in FIG. 6, when the liquid ejecting head 100 performs printing on a printing region R, in order to allow all the nozzle rows 25 to scan from an end of the printing region R in the −Y direction to an end of the printing region R in the +Y direction, the liquid ejecting head 100 is required to move along the Y direction by at least a distance A. The distance A is a sum of a width W of the printing region R in the Y direction and a distance D1 between the nozzle row 25 positioned closest to the −Y direction and the nozzle row 25 positioned closest to the +Y direction. For example, the width W is the same as a width of the medium P in the Y direction. When two dummy nozzle rows 26 are disposed adjacent to the first nozzle plate 161 as in the present embodiment, for example, a distance D1 is shorter, as compared with when the two dummy nozzle rows 26 are not adjacent to each other and a total of six nozzle rows 25 are interposed therebetween in the Y direction. Generally, the reason is that a distance between the adjacent nozzle hole rows 24 in one nozzle plate 160 is shorter than a distance between the adjacent nozzle hole rows 24 each of which is formed in the adjacent nozzle plate 160. As a result, a moving distance of the liquid ejecting head 100 in the Y direction when the printing is performed in the printing region R can be shortened, and there is a high possibility of printing an image more efficiently. In addition, in the present embodiment, since the first nozzle plate 161 is not formed with the nozzle row 25, there is a high possibility of printing an image more efficiently.

The liquid ejecting head 100 in the present embodiment as described above includes the liquid flow channel 50 including the plurality of nozzles 22 constituting the nozzle row 25, the dummy flow channel 56 including the plurality of dummy nozzles 23 constituting the dummy nozzle rows 26, and the closing section 101 closing the dummy flow channel 56 and formed by the adhesive. As a result, since the closing section 101 is formed by the adhesive, the liquid ejecting head 100 having the closed dummy flow channel 56 can be manufactured at low cost.

Further, in the present embodiment, the closing section 101 is disposed upstream from the dummy common liquid chamber 63. As a result, the dummy flow channel 56 can be closed without individually providing the closing section 101 corresponding to the plurality of dummy individual flow channels disposed downstream from the dummy common liquid chamber 63.

Further, in the present embodiment, the liquid ejecting head 100 includes the first adhesive section 102 that is provided between the first flow channel member and the second flow channel member to bond the first flow channel member on which the first dummy portion 53 is formed and the second flow channel member on which the second dummy portion 54 is formed, and the first adhesive section 102 forms the closing section 101. Therefore, when manufacturing the liquid ejecting head 100, the first flow channel member and the second flow channel member can be bonded with the adhesive, and easily form the closing section 101 between the first flow channel member and the second flow channel member.

Further, in the present embodiment, a part of the dummy common liquid chamber 63 is defined by the first flow channel member. According to such an embodiment, it is possible to reduce the volume of the dummy flow channel 56 between the dummy nozzle 23 and the closing section 101 without defining the dummy common liquid chamber 63 by the first flow channel member, for example, as compared with when the first flow channel member is defined by only a separate member. As a result, the negative pressure is less likely to be generated in the dummy flow channel 56 in suction cleaning, and the liquid can be efficiently sucked from the liquid flow channel 50, such that the effect of suction cleaning can be enhanced. For example, even when the entire dummy common liquid chamber 63 is defined by the first flow channel member, the volume of the dummy flow channel 56 between the dummy nozzle 23 and the closing section 101 can be reduced. That is, when at least a part of the dummy common liquid chamber 63 is defined by the first flow channel member, the volume of the dummy flow channel 56 between the dummy nozzle 23 and the closing section 101 can be reduced, and the effect of the suction cleaning can be enhanced.

Further, in the present embodiment, the closing section 101 is provided at a portion of the dummy flow channel 56 extending along the Z direction which is the stacking direction. As a result, an amount of the adhesive required for closing the dummy flow channel 56 can be reduced as compared with when the closing section 101 is provided at a portion of the dummy flow channel 56 extending along a direction intersecting the stacking direction. Therefore, it is possible to reduce time or cost required for closing the dummy flow channel 56 when manufacturing the liquid ejecting head 100.

In the present embodiment, the liquid ejecting head 100 includes the third adhesive section 104 that is formed by the adhesive and provided between the second flow channel member and the third flow channel member to bond the third flow channel member on which the first portion 51 is formed and the second flow channel member on which the second portion 52 is formed, and the third adhesive section 104 forms the second coupling flow channel 62 coupling the first portion 51 and the second portion 52. Accordingly, when manufacturing the liquid ejecting head 100, the third adhesive section 104 and the second coupling flow channel 62, and the first adhesive section 102 and the closing section 101 are formed by the adhesive. Therefore, the third adhesive section 104 and the second coupling flow channel 62, and the first adhesive section 102 and the closing section 101 can be formed by the almost same step using the adhesive, and a step for forming the closing section 101 can be simplified. For example, when a first step is a step of forming the first adhesive section 102 and the closing section 101 by applying the adhesive between the first flow channel member and the second flow channel member, and a second step is a step of forming the third adhesive section 104 and the second coupling flow channel 62 by applying the adhesive between the second flow channel member and the third flow channel member, the first step can be a step of increasing an amount of the adhesive applied as compared with the second step, in order to form the closing section 101 by applying the adhesive between a flow channel corresponding to the first dummy portion 53 and a flow channel corresponding to the second dummy portion 54. In this manner, the first step and the second step can be almost the same, and the step for forming the closing section 101 can be simplified.

Further, in the present embodiment, the liquid ejecting head 100 includes the plurality of head chips 150 and the holder 200 holding the plurality of head chips 150 and the second flow channel member, and as the head chip 150, the liquid ejecting head 100 includes at least the head chip 150 having the first flow channel member and the nozzle plate 160 on which the dummy nozzle row 26 is formed and the head chip 150 having the third flow channel member and the nozzle plate 160 on which the nozzle row 25 is formed. Therefore, when manufacturing the liquid ejecting head 100, the holder 200 and each head chip 150 can be bonded with the adhesive, and the closing section 101 or the second coupling flow channel 62 can be formed.

In the present embodiment, the nozzle plate 160 of the head chip 150 having the first flow channel member is formed with the plurality of dummy nozzle rows 26 adjacent to each other. Therefore, there is a high possibility of performing more efficient printing using the liquid ejecting head 100.

In the present embodiment, the nozzle plate 160 of the head chip 150 having the first flow channel member is not formed with the nozzle row 25. Therefore, there is a high possibility of performing more efficient printing using the liquid ejecting head 100.

In the present embodiment, the total number of rows of the nozzle hole row 24 formed on the nozzle plate 160 of each head chip 150 is the common number of rows, and in general, the liquid ejecting head 100 includes the dummy nozzle row 26 having the common number of rows or more. As a result, as compared with a case of constituting the liquid ejecting head having the reduced number of nozzle rows 25 by reducing the number of head chips 150, each member, such as a fixing plate 250 or the cap 110, and each member constituting the liquid ejecting head having no dummy flow channel 56 are easily commonized. Therefore, the liquid ejecting head 100 can be manufactured at low cost.

In the present embodiment, the plurality of head chip 150 has common structures, respectively. Therefore, costs required for manufacturing the plurality of head chips 150 can be reduced.

In the present embodiment, the dummy flow channel 56 includes the dummy filter chamber 44 is disposed upstream from the closing section 101. According to such an embodiment, the volume of the dummy flow channel 56 between the dummy nozzle 23 and the closing section 101 can be reduced as compared with when the dummy filter chamber 44 in the dummy flow channel 56 is disposed downstream from the closing section 101. As a result, the negative pressure is less likely to be generated in the dummy flow channel 56 in suction cleaning, and the liquid can be efficiently sucked from the liquid flow channel 50, such that the effect of suction cleaning can be enhanced.

In the present embodiment, the liquid ejecting apparatus 300 includes the cap 110 configured to form the closed space CL to which the opening of the nozzle 22 and the opening of the dummy nozzle 23 are open between the ejection surface 19 and the cap 110 by covering at least a part of the ejection surface 19. As a result, even when the cap 110 diverted from the liquid ejecting head which does not include the dummy flow channel 56 covers the opening of the nozzle 22 and the opening of the dummy nozzle 23 with the common closed space CL, the dummy flow channel 56 is closed by the closing section 101. Thus, the negative pressure is hardly generated in the dummy flow channel 56 via the closed space CL in the suction cleaning. Therefore, the suction cleaning of the liquid flow channel 50 can be effectively performed without manufacturing a new cap 110 that only covers the nozzle 22 and does not cover the dummy nozzle 23.

B. Second Embodiment

Figure 7:
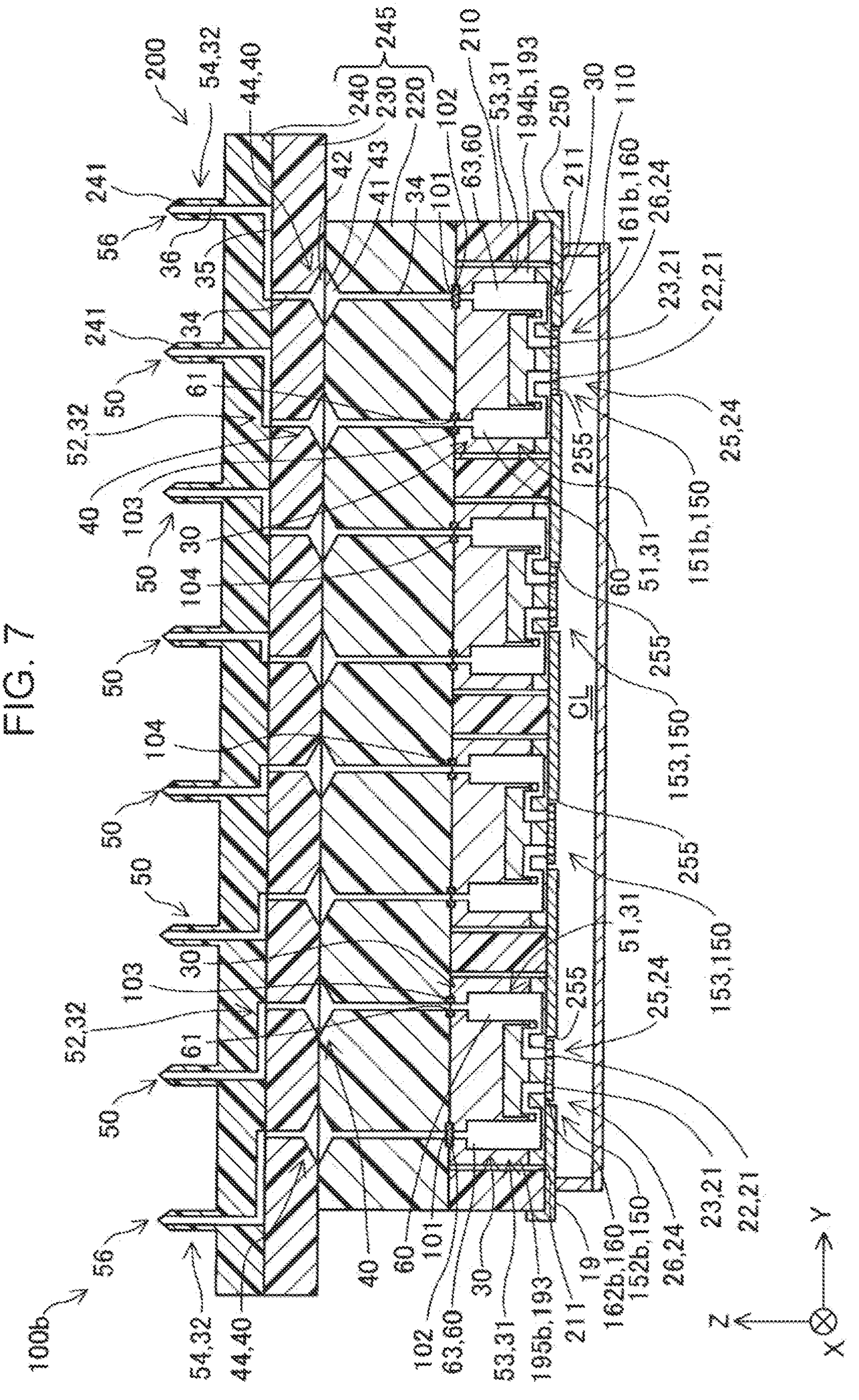
FIG. 7 is a cross-sectional view schematically illustrating a schematic configuration of a liquid ejecting head according to a second embodiment.

FIG. 7 is a cross-sectional view schematically illustrating a schematic configuration of a liquid ejecting head **100*b* according to a second embodiment. The present embodiment is different from the first embodiment in that first case section 194*b* corresponding to the first flow channel member is formed with the first portion 51 in addition to the first dummy portion 53. In addition, the liquid ejecting head 100*b* includes the second adhesive section 103 which will be described later. Among configurations of the liquid ejecting apparatus 300 and the liquid ejecting head 100*b*** in the second embodiment, the portions not particularly described are the same as those in the first embodiment.

In the present embodiment, among two chip flow channels 30 formed in the first head chip **151*b*, the chip flow channel 30 positioned in the +Y direction corresponds to a part of the dummy flow channel 56, and the chip flow channel 30 positioned in the −Y direction corresponds to a part of the liquid flow channel 50. Similarly, of the first flow channel 31 formed in the first case section 194*b* corresponding to the first flow channel member, the chip flow channel 30 positioned in the +Y direction corresponds to the first dummy portion 53, and the chip flow channel 30 positioned in the −Y direction corresponds to the first portion 51. The present embodiment is different from the first embodiment in that a first nozzle plate 161*b* of the first head chip 151*b* is formed with the dummy nozzle row 26 and the nozzle row 25 communicating with the first portion 51 that is formed on the first case section 194*b*. In the present embodiment, the dummy nozzle row 26 and the nozzle row 25 are formed in a row on the first nozzle plate 161*b*. The dummy nozzle row 26 is formed on the first nozzle plate 161*b* in the +Y direction of the nozzle row 25**.

In the present embodiment, a second head chip **152*b* has the same configuration as the first head chip 151*b*. More specifically, the second head chip 152*b* has a configuration in which disposition of the chip flow channel 30 corresponding to a part of the dummy flow channel 56 in the first head chip 151*b* and the chip flow channel 30 corresponding to a part of the liquid flow channel 50 is exchanged. That is, the second case section 195*b* corresponds to the first flow channel member, like the first case section 194*b*. In addition, the second nozzle plate 162*b* is formed with the dummy nozzle row 26 and the nozzle row 25. The configuration of the third head chip 153 is the same as that of the first embodiment. Accordingly, in the present embodiment, the dummy nozzle row 26 is provided closest to the −Y direction and closest to the +Y direction of each nozzle hole row 24** in a row.

The second adhesive section 103 refers to a portion formed by the adhesive and provided between the first flow channel member and the second flow channel member to bond the first flow channel member and the second flow channel member. The second adhesive section 103 forms the first coupling flow channel 61 coupling the first portion 51 formed on the first flow channel member and the second portion 52. Like the first adhesive section 102, the second adhesive section 103 is formed by, for example, a silicone-based adhesive or an epoxy-based adhesive.

In the present embodiment, the second adhesive section 103 is provided one each in the first case section **194*b* corresponding to the first flow channel member, and similarly, between the second case section 195*b* corresponding to the first flow channel member and the flow channel forming section 245 corresponding to the second flow channel member. Each second adhesive section 103 forms the first coupling flow channel 61 that couples the first portion 51 formed between the first case section 194*b* and the second case section 195*b* and the second portion 52 formed on the flow channel forming section 245. In the present embodiment, for example, when the second adhesive section 103 and the first coupling flow channel 61 are bonded by stacking the second layer 220 on the first case section 194*b* or the second case section 195*b*, the second adhesive section 103 and the first coupling flow channel 61 are formed by the same method as a method for forming the third adhesive section 104 and the second coupling flow channel 62** described in the first embodiment.

Even with the liquid ejecting head 100*b* in the second embodiment described above, the closing section 101 is formed by the adhesive, the liquid ejecting head 100 having the closed dummy flow channel 56 can thus be manufactured at low cost. Particularly, in the present embodiment, the liquid ejecting head 100*b* includes the second adhesive section 103 that is formed by the adhesive and provided between the first flow channel member and the second flow channel member to bond the first flow channel member on which the first portion 51 is formed and the second flow channel member on which the second portion 52 is formed, and the second adhesive section 103 forms the first coupling flow channel 61 coupling the first portion 51 formed on the first flow channel member and the second portion 52 formed on the second flow channel member. Accordingly, when manufacturing the liquid ejecting head 100*b*, the second adhesive section 103 and the first coupling flow channel 61, and the first adhesive section 102 and the closing section 101 are formed by the adhesive. Therefore, even when the first dummy portion 53 and the first portion 51 are formed on the first flow channel member, the second adhesive section 103 and the first coupling flow channel 61, and the first adhesive section 102 and the closing section 101 can be formed by the almost same step using the adhesive, and a step for forming the closing section 101 can be simplified. For example, when a first step is a step of forming the first adhesive section 102 and the closing section 101 by applying the adhesive between the first flow channel member and the second flow channel member, and similarly, a third step is a step of forming the second adhesive section 103 and the first coupling flow channel 61 by applying the adhesive, the first step can be a step of increasing an amount of the adhesive applied as compared with the third step, in order to form the closing section 101 by applying the adhesive between a flow channel corresponding to the first dummy portion 53 and a flow channel corresponding to the second dummy portion 54. In this manner, the first step and the third step can be almost the same, and the step for forming the closing section 101 can be simplified.

In the present embodiment, the liquid ejecting head 100*b* includes the plurality of head chips 150 and the holder 200 holding the plurality of head chips 150 and having the second flow channel member, and the liquid ejecting head 100*b* includes, as the head chip 150, at least a head chip 150 having the first flow channel member and the nozzle plate 160 on which the nozzle row 25 and the dummy nozzle row 26 are formed. Therefore, when manufacturing the liquid ejecting head 100*b*, the holder 200 and each head chip 150 can be bonded with the adhesive, and the closing section 101 or the first coupling flow channel 61 can be formed.

C. Third Embodiment

Figure 8:
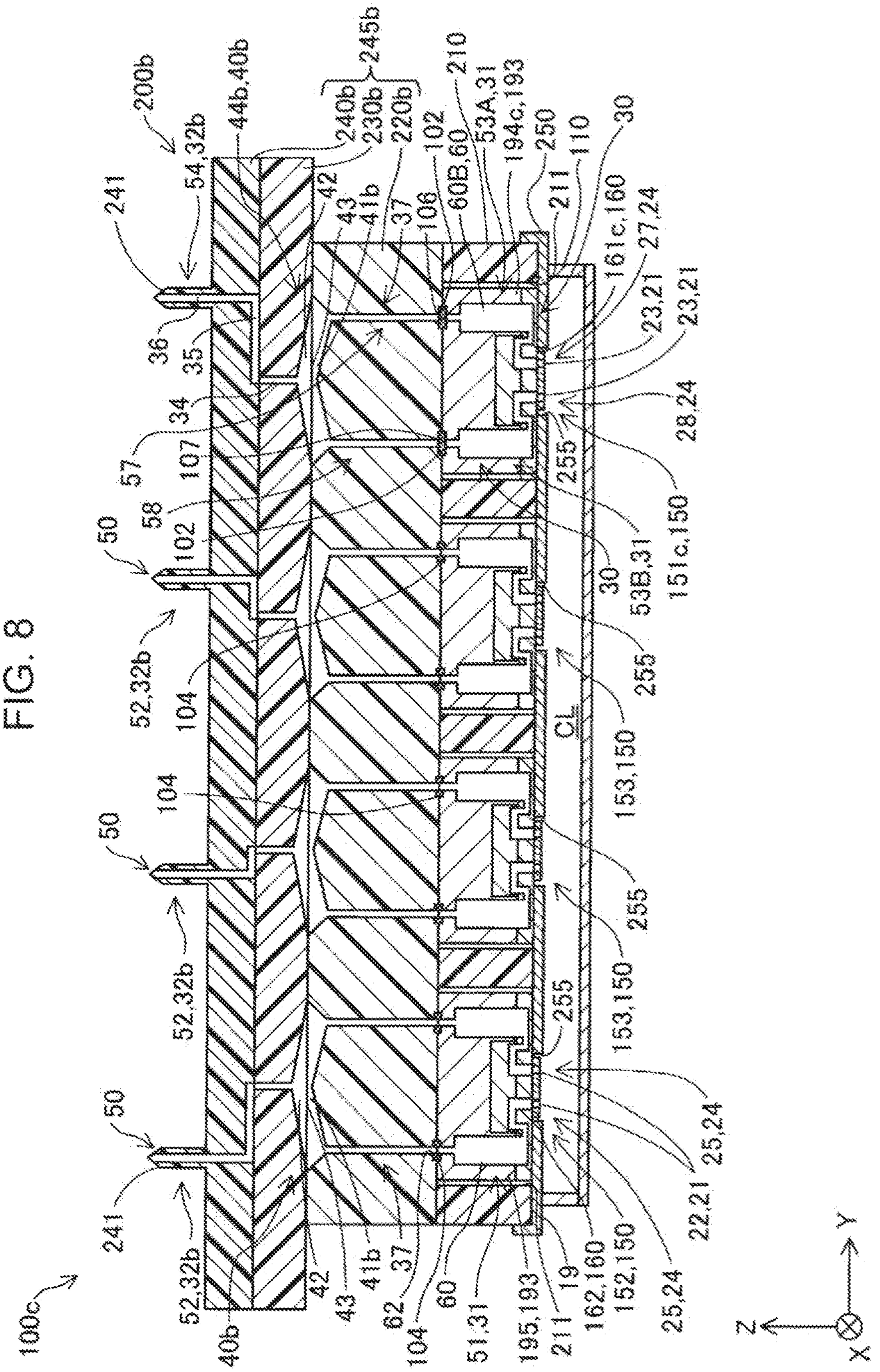
FIG. 8 is a cross-sectional view schematically illustrating a schematic configuration of a liquid ejecting head according to a third embodiment.

FIG. 8 is a cross-sectional view schematically illustrating a schematic configuration of a liquid ejecting head 100*c* according to a third embodiment. The present embodiment is different from the first embodiment in that the liquid ejecting head 100*c* includes a first joining section where two dummy flow channels are joined. In the present embodiment, a dummy filter chamber 44*b* corresponds to the first joining section. Among configurations of the liquid ejecting apparatus 300 and the liquid ejecting head 100*c* in the third embodiment, the portions not particularly described are the same as those in the first embodiment.

In the present embodiment, the liquid ejecting head 100*c* includes a first dummy flow channel 57 and a second dummy flow channel 58 as dummy flow channels. The first dummy flow channel 57 refers to a dummy flow channel including the plurality of dummy nozzles 23 constituting the first dummy nozzle row 27 as a dummy nozzle row. The second dummy flow channel 58 refers to a dummy flow channel including the plurality of dummy nozzles 23 constituting the second dummy nozzle row 28 as a dummy nozzle row.

In the present embodiment, the liquid ejecting head 100*c* is provided with eight first flow channels 31 as in the first embodiment. On the other hand, in the present embodiment, a second flow channel 32*b* is not provided one-to-one corresponding to the first flow channel 31, but one second flow channel 32*b* is provided in each of the two first flow channels 31. More specifically, the flow channel forming section 245*b* of a holder 200*b* in the present embodiment is provided with four second flow channels 32*b* that is branched in the middle, and each of the second flow channels 32*b* communicates with two corresponding first flow channels 31. In the present embodiment, among the second flow channels 32*b*, one second flow channel 32*b* positioned closest to the +Y direction corresponds to the second dummy portion 54 in the first dummy flow channel 57 and the second dummy flow channel 58. In addition, the three second flow channels 32*b* except for the second flow channel 32*b* corresponding to the second dummy portion 54 correspond to the second portions 52 in the liquid flow channel 50.

In the present embodiment, in a fourth layer 240*b* of a flow channel forming section 245*b*, the coupling section 241, the fourth holder flow channel 36, and the third holder flow channel 35 are provided one each for two first flow channels 31. In the third layer 230*b*, one second holder flow channel 34 is provided for two first flow channels 31. A second layer 220*b* is provided with a branch flow channel 37 for communicating the second holder flow channel 34 and two first flow channels 31 with each other. The branch flow channel 37 is branched into two in a first space 41*b* formed at an upper end portion of the branch flow channel 37, and branched flow channels communicate with the first flow channels 31, respectively. The first space 41*b* and the second space 42 of the second holder flow channel 34*b* form a filter chamber 40*b* as in the first embodiment.

In the present embodiment, among two chip flow channels 30 provided in a first head chip 151*c*, the chip flow channel 30 positioned in the +Y direction corresponds to a part of the first dummy flow channel 57, and the chip flow channel 30 positioned in the −Y direction corresponds to a part of the second dummy flow channel 58. In the present embodiment, a first nozzle plate 161*c* of a first head chip 151*c* is formed with the first dummy nozzle row 27 and the second dummy nozzle row 28 as dummy nozzle rows. Further, a first case section 194*c* corresponding to the first flow channel member is formed with a first dummy portion 53A of the first dummy flow channel 57 and a first dummy portion 53B of the second dummy flow channel 58. The configurations of the second head chip 152 and the third head chip 153 in the present embodiment are the same as those in the first embodiment.

The first dummy flow channel 57 and the second dummy flow channel 58 are joined at the dummy filter chamber 44*b* corresponding to the first joining section described above. In the present embodiment, in the second flow channel 32*b* communicating with the first dummy nozzle row 27 and the second dummy nozzle row 28, portions of the filter chamber 40*b* and positioned upstream from the filter chamber 40*b* are the common portions in the first dummy flow channel 57 and the second dummy flow channel 58. That is, the portion positioned upstream from the first joining section of the first dummy flow channel 57 and the second dummy flow channel 58 is a part of the first dummy flow channel 57 or a part of the second dummy flow channel 58.

The liquid ejecting head 100*c* includes, as a closing section, a first closing section 106 that closes the first dummy flow channel 57 and a second closing section 107 that closes the second dummy flow channel 58. In the present embodiment, the first closing section 106 and the second closing section 107 are formed by the first adhesive section 102, like the closing section 101 in the first embodiment. As illustrated in FIG. 8, the first closing section 106 and the second closing section 107 are disposed downstream from the dummy filter chamber 44*b*, which is the first joining section, in the first dummy flow channel 57 and the second dummy flow channel 58.

According to the liquid ejecting head 100*c* of the third embodiment described above, the first closing section 106 that closes the first dummy flow channel 57 and the second closing section 107 that closes the second dummy flow channel 58 are disposed downstream from the first joining section where the first dummy flow channel 57 and the second dummy flow channel 58 are joined. According to such an embodiment, it is possible to shorten a flow channel length of the dummy flow channel from each closing section to each dummy nozzle row, as compared with when each closing section is disposed upstream from the first joining section. As a result, the negative pressure is less likely to be generated in each dummy flow channel in the suction cleaning, and the liquid can be efficiently sucked from the liquid flow channel 50, such that the effect of suction cleaning can be enhanced.

D. Fourth Embodiment

Figure 9:
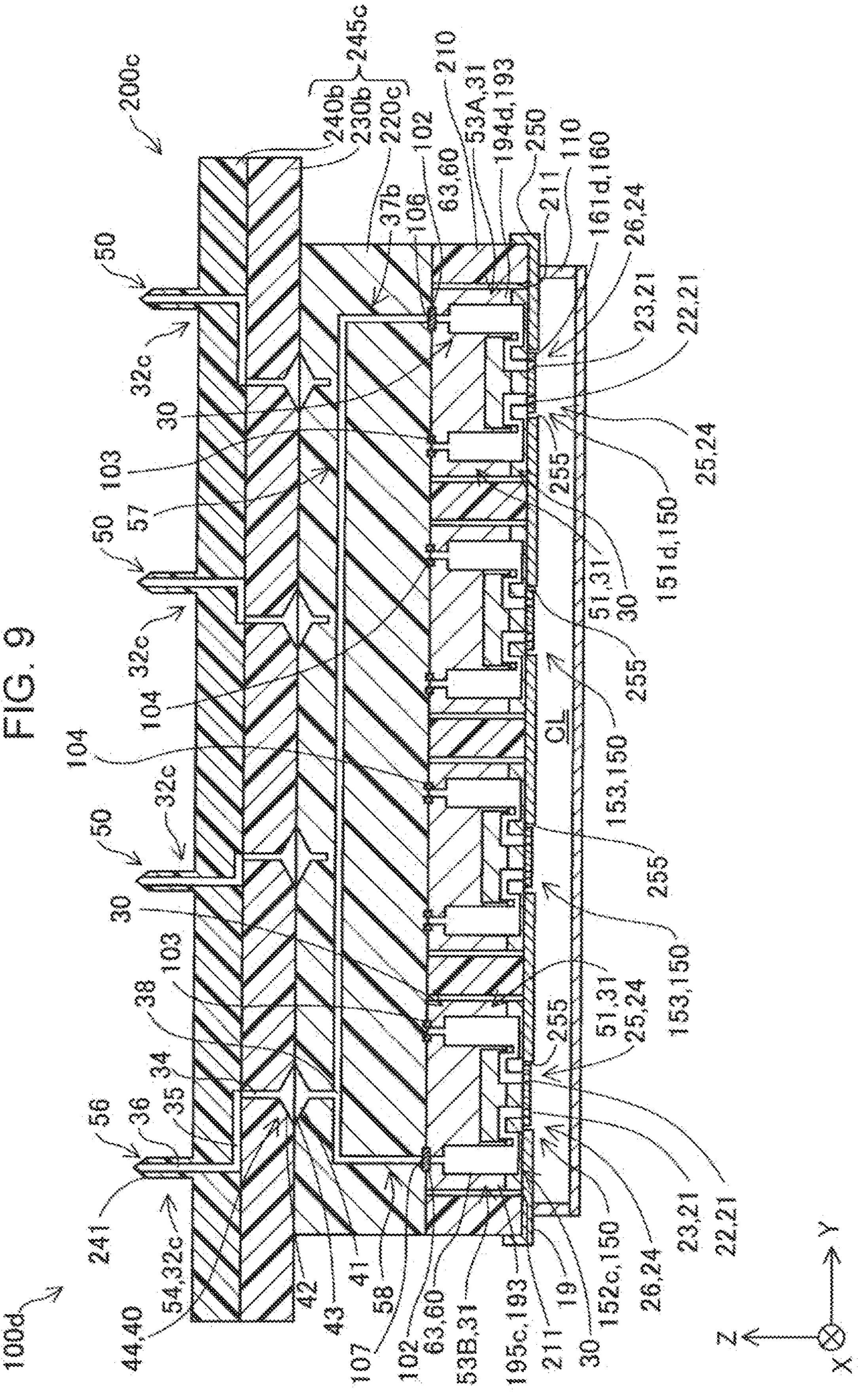
FIG. 9 is a cross-sectional view schematically illustrating a schematic configuration of a liquid ejecting head according to a fourth embodiment.

FIG. 9 is a cross-sectional view schematically illustrating a schematic configuration of a liquid ejecting head 100*d* according to a fourth embodiment. The present embodiment is different from the third embodiment in that the first dummy portion 53B of the second dummy flow channel 58 is not provided on the first case section 194*d* of the first head chip 151*d*, and the first dummy portion 53B of the second dummy flow channel 58 is provided on the second case section 195*c* of the second head chip 152*c*. Each of the first case section 194*d* and the second case section 195*c* corresponds to the first flow channel member. Further, the second dummy nozzle row 28 is formed in a second nozzle plate 162*c*, not on a first nozzle plate 161*d*. Among configurations of the liquid ejecting apparatus 300 and the liquid ejecting head 100*d* in the fourth embodiment, the portions not particularly described are the same as those in the third embodiment.

In the present embodiment, among two chip flow channels 30 provided in a first head chip 151*d*, the chip flow channel 30 positioned in the +Y direction corresponds to a part of the first dummy flow channel 57, and the chip flow channel 30 positioned in the −Y direction corresponds to a part of the liquid flow channel 50. In addition, among the chip flow channels 30 provided in a second head chip 152*c*, the chip flow channel 30 positioned in the +Y direction corresponds to a part of the liquid flow channel 50, and the chip flow channel 30 positioned in the −Y direction corresponds to a part of the second dummy flow channel 58. In addition to the first dummy nozzle row 27 or the second dummy nozzle row 28 described above, one nozzle row 25 is formed on each of the first nozzle plate 161*d* and the second nozzle plate 162*c*. Further, in addition to the first dummy portion 53A and the first dummy portion 53B, the first portion 51 of the liquid flow channel 50 is formed on each of the first case section 194*d* and the second case section 195*c*.

In the present embodiment, a holder 200*c* has a flow channel forming section 245*c*. Unlike the third embodiment, a branch flow channel 37*b* formed in the second layer 220*c* of the flow channel forming section 245*c* is branched into two at a branch point 38 instead of the filter chamber 40. The branch point 38 is positioned closer to the nozzle hole row 24 than the first space 41 in the second flow channel 32*c*. Although not illustrated in FIG. 9 that a part of the second flow channel 32*c* except for the second flow channel 32*c* that communicates with the first dummy nozzle row 27 and the second dummy nozzle row 28, each of the second flow channel 32*c* is coupled to any first flow channel 31. In the present embodiment, the branch point 38 in the second flow channel 32*c* communicating with the first dummy nozzle row 27 and the second dummy nozzle row 28 corresponds to the first joining section. In the present embodiment, the second flow channel 32*c* communicating with the first dummy nozzle row 27 and the second dummy nozzle row 28 corresponds to the second dummy portion 54. Each of the first closing section 106 and the second closing section 107 is disposed downstream from the branch point 38, which is the first joining section, as in the third embodiment.

Even with the liquid ejecting head 100*d* of the fourth embodiment as described above, it is possible to shorten a flow channel length of the dummy flow channel from each closing section to each dummy nozzle row 26, as compared with when each closing section is disposed upstream from the first joining section. As a result, the negative pressure is less likely to be generated in each dummy flow channel in the suction cleaning, and the liquid can be efficiently sucked from the liquid flow channel 50, such that the effect of suction cleaning can be enhanced.

E. Fifth Embodiment

Figure 10:
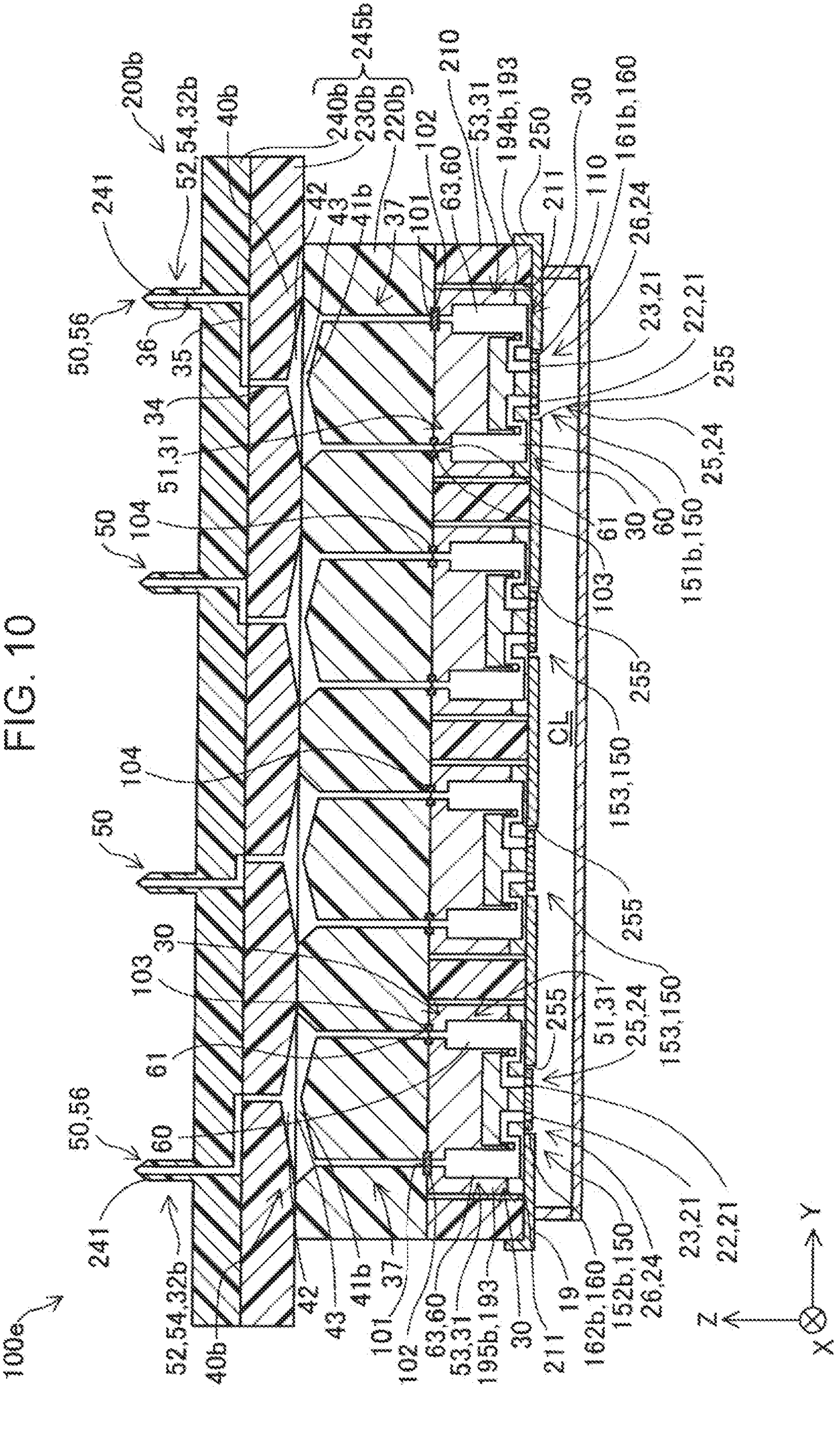
FIG. 10 is a cross-sectional view schematically illustrating a schematic configuration of a liquid ejecting head according to a fifth embodiment.

FIG. 10 is a cross-sectional view schematically illustrating a schematic configuration of a liquid ejecting head 100*e* according to a fifth embodiment. The present embodiment is different from the third embodiment in that the liquid ejecting head 100*e* includes a second joining section where the dummy flow channel 56 and the liquid flow channel 50 are joined, instead of the first joining section. Among configurations of the liquid ejecting apparatus 300 and the liquid ejecting head 100*e* in the fifth embodiment, the portions not particularly described are the same as those in the third embodiment.

The configuration and the disposition of each head chip 150 in the present embodiment are the same as those in the second embodiment. In the present embodiment, the filter chamber 40*b* of the second flow channel 32*b* communicating with the nozzle row 25 and the dummy nozzle row 26 corresponds to the second joining section described above. The closing section 101 is disposed downstream of the dummy flow channel 56 from the second joining section. In the present embodiment, the liquid storage section 310 is coupled to all four coupling sections 241 provided on the fourth layer 240*b*. Therefore, the liquid flows into an upstream portion of the dummy flow channel 56 from the closing section 101. Further, in the second flow channel 32*b* communicating with the nozzle row 25 and the dummy nozzle row 26, portions of the filter chamber 40*b* and positioned upstream from the filter chamber 40*b* are the common portions in the liquid flow channel 50 and the dummy flow channel 56 joined at the filter chamber 40*b*. The filter chamber 40*b*, which is the second joining section, functions as a dummy filter chamber in the dummy flow channel 56.

According to the liquid ejecting head 100*e* of the fifth embodiment described above, the closing section 101 is disposed downstream from the second joining section where the dummy flow channel 56 and the liquid flow channel 50 are joined. Therefore, the liquid ejecting head 100*e* having the dummy flow channel 56 can be manufactured by closing a part of the plurality of flow channels that are joined with each other by the closing section 101.

F. Other Embodiments (F-1) In the embodiments, the first case section 194 of the first head chip 151 corresponds to the first flow channel member, and the flow channel forming section 245 of the holder 200 corresponds to the second flow channel member. On the other hand, members corresponding to the first flow channel member and the second flow channel member do not have to be the first case section 194 and the flow channel forming section 245, respectively. For example, the first nozzle plate 161 may be the member corresponding to the first flow channel member, and the communication plate 180 stacked on the first nozzle plate 161 may be the member corresponding to the second flow channel member. In this case, the dummy nozzle 23 of the first nozzle plate 161 corresponds to the first dummy portion, the nozzle communication passage 181 of the first head chip 151 corresponds to the second dummy portion, the nozzle 22 of the second nozzle plate 162 corresponds to the first portion, and the nozzle communication passage 181 of the second head chip 152 corresponds to the second portion. The first adhesive section 102 and the closing section 101 are disposed between the first nozzle plate 161 and the communication plate 180. In addition, for example, the second layer 220 of the flow channel forming section 245 may be the member corresponding to the first flow channel member, and the third layer 230 may be the member corresponding to the second flow channel member. In this case, the first holder flow channel 33 communicating with the dummy nozzle 23 corresponds to the first dummy portion, and the second holder flow channel 34 communicating with the first holder flow channel 33 communicating with the dummy nozzle 23 corresponds to the second dummy portion. In this case, the first holder flow channel 33 communicating with the nozzle 22 corresponds to the first portion 51, and the second holder flow channel 34 communicating with the first holder flow channel 33 communicating with the nozzle 22 corresponds to the second portion. The first adhesive section 102 and the closing section 101 are disposed between the second layer 220 and the third layer 230.

(F-2) In the embodiments, the first adhesive section 102 forms the closing section 101. On the other hand, the first adhesive section 102 does not have to form the closing section 101. For example, the closing section 101 may be provided at a portion other than between the members stacked on each other, and may be provided on the lower surface of the nozzle plate 160, in the nozzle hole 21, in the pressure generating chamber 187, in the second manifold section 183, in the liquid chamber section 197, the first holder flow channel 33, or the like.

(F-3) In the embodiments, the closing section 101 is provided at a portion of the dummy flow channel 56 extending along the Z direction which is the stacking direction. On the other hand, the closing section 101 may not be provided at the portion of the dummy flow channel 56 extending along the stacking direction, for example, may be provided at a portion extending along the X direction or the Y direction, which is a direction perpendicular to the stacking direction.

(F-4) In the embodiments, the closing section 101 is disposed upstream of the dummy flow channel 56 from the dummy common liquid chamber 63. On the other hand, the closing section 101 may not be disposed upstream of the dummy common liquid chamber 63, for example, may be disposed in the dummy common liquid chamber 63, or may be disposed downstream from the dummy common liquid chamber 63.

(F-5) In the embodiments, at least a part of the dummy common liquid chamber 63 is defined by the first flow channel member. On the other hand, the dummy common liquid chamber 63 may not be defined by the first flow channel member. For example, the dummy common liquid chamber 63 may not be defined by the first case section 194 corresponding to the first flow channel member, and the common liquid chamber section 60 may be defined by only the communication plate 180 in which a downstream portion of the dummy flow channel 56 from the first dummy portion 53 is formed.

(F-6) In the embodiments, the liquid ejecting head 100 includes dummy nozzle rows 26 having a common number of rows or more of the nozzle hole row 24 formed on each nozzle plate 160. On the other hand, the number of dummy nozzle rows 26 provided in the liquid ejecting head 100 may be one or more and less than the common number of rows.

(F-7) In the embodiments, each head chip 150 has a common structure. On the other hand, the head chips 150 do not have to have a common structure.

(F-8) In the embodiments, the dummy filter chamber 44 is disposed upstream of the dummy flow channel 56 from the closing section 101. On the other hand, the dummy filter chamber 44 may not be disposed upstream of the closing section 101, and for example, the dummy filter chamber 44 may be disposed downstream from the closing section 101, or the closing section 101 may be disposed in the dummy filter chamber 44. In addition, the dummy flow channel 56 may not have the dummy filter chamber 44.

(F-9) In the embodiments, two dummy flow channels 56 are joined at the first joining section. On the other hand, for example, three or more dummy flow channels 56 or two or more dummy flow channels 56 and one or a plurality of liquid flow channels 50 may be joined at the first joining section. Similarly, for example, in addition to one liquid flow channel 50 and the dummy flow channel 56, another liquid flow channel 50 or the dummy flow channel 56 may be further joined at the second joining section.

(F-10) In the embodiments, two nozzle hole rows 24 are formed on each nozzle plate 160. On the other hand, each nozzle plate 160 may be formed with only one row of nozzle hole rows 24, or may be formed with three or more rows of nozzle hole rows 24.

(F-11) In the embodiments, the liquid ejecting head 100 includes four head chips 150. On the other hand, the liquid ejecting head 100 may include three or fewer head chips 150, or may include five or more head chips 150.

(F-12) In the embodiments, one liquid flow channel 50 or the dummy flow channel 56 is provided with one nozzle hole row 24. On the other hand, for example, one nozzle hole row 24 may be provided for a plurality of liquid flow channels 50 or the plurality of dummy flow channels 56. In this case, for example, a part of the liquid flow channels 50 among the plurality of liquid flow channels 50 may function as a supply flow channel for supplying the liquid to the nozzle row 25, and other liquid flow channels 50 may function as a recovery flow channel for recovering the liquid from the nozzle row 25 toward the liquid storage section 310. That is, a circulation flow channel for circulating the liquid may be formed by the plurality of liquid flow channels 50.

G. Other Aspects

The present disclosure is not limited to the embodiments described above and can be realized in various aspects without departing from the gist of the present disclosure. For example, the present disclosure can also be realized by the following aspects. The technical features in each of the embodiments described above corresponding to the technical features in each of aspects described below may be replaced or combined as appropriate in order to solve a part or all of the problems which the present disclosure includes or to accomplish part of all of the effects which the present disclosure achieves. In addition, unless the technical feature is described as essential in the present disclosure, the technical feature can be deleted as appropriate.

(1) According to a first aspect of the present disclosure, there is provided a liquid ejecting head. The liquid ejecting head includes: a liquid flow channel including a plurality of nozzles constituting a nozzle row for ejecting a liquid; a dummy flow channel including a plurality of dummy nozzles constituting a dummy nozzle row for ejecting no liquid; and a closing section formed by an adhesive and closing the dummy flow channel.

According to such an aspect, since the closing section can be formed by the adhesive, the liquid ejecting head having the closed dummy flow channel can be manufactured at low cost.

(2) In the liquid ejecting head according to the aspect, the dummy flow channel may include a dummy common liquid chamber communicating with the plurality of dummy nozzles constituting the dummy nozzle row, and the closing section may be disposed upstream from the dummy common liquid chamber. According to such an aspect, the dummy flow channel can be closed without individually providing the closing section corresponding to the plurality of dummy nozzle rows at a downstream portion of the dummy flow channel from the dummy common liquid chamber.

(3) The liquid ejecting head according to the aspect may further include a first flow channel member formed with a first dummy portion which is a part of the dummy flow channel, a second flow channel member having a second dummy portion, which is a part of the dummy flow channel and is formed upstream from the first dummy portion, and stacked on the first flow channel member, and a first adhesive section formed by an adhesive and provided between the first flow channel member and the second flow channel member to bond the first flow channel member and the second flow channel member, and the first adhesive section may form the closing section. According to such an aspect, when manufacturing the liquid ejecting head, the first flow channel member and the second flow channel member can be bonded with the adhesive, and easily form the closing section between the first flow channel member and the second flow channel member.

(4) In the liquid ejecting head according to the aspect, at least a part of the dummy common liquid chamber may be defined by the first flow channel member. According to such an aspect, it is possible to reduce the volume of the dummy flow channel between the dummy nozzle and the closing section without defining the dummy common liquid chamber by the first flow channel member, for example, as compared with when the first flow channel member is defined by only a separate member. Therefore, a negative pressure is less likely to be generated in the dummy flow channel in suction cleaning, and the liquid can be efficiently sucked from the liquid flow channel, such that the effect of suction cleaning can be enhanced.

(5) In the liquid ejecting head according to the aspect, the closing section may be provided at a portion of the dummy flow channel extending along a stacking direction of the first flow channel member and the second flow channel member. According to such an aspect, an amount of the adhesive required for closing the dummy flow channel can be reduced as compared with when the closing section is provided at a portion of the dummy flow channel extending along a direction intersecting the stacking direction. Therefore, it is possible to reduce time or cost required for closing the dummy flow channel when manufacturing the liquid ejecting head.

(6) In the liquid ejecting head according to the aspect, the first flow channel member may be formed with a first portion which is a part of the liquid flow channel, the second flow channel member may be formed with a second portion which is a part of the liquid flow channel and farther from the nozzle row than the first portion in the liquid flow channel, the liquid ejecting head may further include a second adhesive section formed by an adhesive and provided between the first flow channel member and the second flow channel member to bond the first flow channel member and the second flow channel member, and the second adhesive section may form a first coupling flow channel coupling the first portion and the second portion. According to such an aspect, when manufacturing the liquid ejecting head, the second adhesive section and the first coupling flow channel, and the first adhesive section and the closing section can be formed by the adhesive. Therefore, even when the first dummy portion and the first portion are formed on the first flow channel member, the second adhesive section and the first coupling flow channel, and the first adhesive section and the closing section can be formed by the almost same step using the adhesive, and a step for forming the closing section can be simplified.

(7) The liquid ejecting head according to the aspect may further include a third flow channel member formed with the first portion which is a part of the liquid flow channel, in which the second flow channel member may be stacked on the first flow channel member and the third flow channel member, the second flow channel member may be formed with a second portion which is a part of the liquid flow channel and farther from the nozzle row than the first portion in the liquid flow channel, the liquid ejecting head may further include a third adhesive section formed by an adhesive and provided between the second flow channel member and the third flow channel member to bond the second flow channel member and the third flow channel member, and the third adhesive section may form a second coupling flow channel coupling the first portion and the second portion. According to such an aspect, when manufacturing the liquid ejecting head, the third adhesive section and the second coupling flow channel, and the first adhesive section and the closing section can be formed by the adhesive. Therefore, the third adhesive section and the second coupling flow channel, and the first adhesive section and the closing section can be formed by the almost same step using the adhesive, and a step for forming the closing section can be simplified.

(8) The liquid ejecting head according to the aspect may further include a plurality of head chips each of which having a nozzle plate on which at least one of the nozzle row and the dummy nozzle row is formed, and a holder holding the plurality of head chips and having the second flow channel member, in which as the head chip, at least a head chip including the first flow channel member and the nozzle plate formed with the nozzle row communicating with the first portion and the dummy nozzle row communicating with the first dummy portion may be provided. According to such an aspect, when manufacturing the liquid ejecting head, the holder and each head chip can be bonded with the adhesive, and the closing section or the first coupling flow channel can be formed.

(9) The liquid ejecting head according to the aspect may further include a plurality of head chips each of which having a nozzle plate on which at least one of the nozzle row and the dummy nozzle row is formed, and a holder holding the plurality of head chips and having the second flow channel member, in which as the head chip, at least a head chip including the first flow channel member and the nozzle plate formed with the dummy nozzle row communicating with the first dummy portion, and a head chip including the third flow channel member and the nozzle plate formed with the nozzle row communicating with the first portion may be provided. According to such an aspect, when manufacturing the liquid ejecting head, the holder and each head chip can be bonded with the adhesive, and the closing section or the second coupling flow channel can be formed.

(10) The liquid ejecting head according to the aspect may further include a plurality of the dummy flow channels, in which the nozzle plate of the head chip having the first flow channel member may be formed with a plurality of the dummy nozzle rows adjacent to each other. According to such an aspect, there is a high possibility of performing more efficient printing on an image using the liquid ejecting head.

(11) In the liquid ejecting head according to the aspect, the nozzle plate of the head chip having the first flow channel member may not be formed with the nozzle row. According to such an aspect, there is a high possibility of performing more efficient printing on an image using the liquid ejecting head.

(12) In the liquid ejecting head according to the aspect, a total number of rows of the nozzle row and the dummy nozzle row formed on the nozzle plate of each head chip may be a common number of rows, and the liquid ejecting head may include the dummy nozzle row having the common number of rows or more. According to such an aspect, as compared with a case of constituting the liquid ejecting head having the reduced number of nozzle rows by reducing the number of head chips, each member constituting the liquid ejecting head having no dummy flow channel and each member constituting the liquid ejecting head having the dummy flow channel are more easily commonized. Therefore, the liquid ejecting head can be manufactured at low cost.

(13) In the liquid ejecting head according to the aspect, each of the plurality of head chips may have a common structure. According to such an aspect, costs required for manufacturing the plurality of head chips can be reduced.

(14) In the liquid ejecting head according to the aspect, the dummy flow channel may be disposed upstream from the closing section, and may include a dummy filter chamber having a filter therein. According to such an aspect, the liquid can be efficiently sucked from the liquid flow channel in the suction cleaning, such that the effect of suction cleaning can be enhanced.

(15) In the liquid ejecting head according to the aspect, as the dummy flow channel, a first dummy flow channel including a plurality of dummy nozzles constituting a first dummy nozzle row as the dummy nozzle row, and a second dummy flow channel including a plurality of dummy nozzles constituting a second dummy nozzle row as the dummy nozzle row may be provided, as the closing section, a first closing section closing the first dummy flow channel, and a second closing section closing the second dummy flow channel may be provided, the liquid ejecting head may further include a first joining section where the first dummy flow channel and the second dummy flow channel are joined, and the first closing section and the second closing section are disposed downstream from the first joining section. According to such an embodiment, it is possible to shorten a flow channel length of the dummy flow channel from each closing section to each dummy nozzle row, as compared with when each closing section is disposed upstream from the first joining section. As a result, the negative pressure is less likely to be generated in each dummy flow channel in the suction cleaning, and the liquid can be efficiently sucked from the liquid flow channel, such that the effect of suction cleaning can be enhanced.

(16) In the liquid ejecting head according to the aspect, the liquid ejecting head may include a second joining section at which the dummy flow channel and the liquid flow channel are joined, and the closing section may be disposed downstream from the second joining section. According to such an aspect, the liquid ejecting head having the dummy flow channel can be manufactured by closing a part of the plurality of flow channels that are joined with each other by the closing section.

(17) According to a second aspect of the present disclosure, there is provided a liquid ejecting apparatus. The liquid ejecting apparatus includes: the liquid ejecting head of the first aspect; and a liquid storage section storing the liquid supplied to the liquid ejecting head.

(18) In the liquid ejecting apparatus according to the aspect, the liquid ejecting head may include an ejection surface on which an opening of the nozzle constituting the nozzle row and an opening of the dummy nozzle constituting the dummy nozzle row are formed, and the liquid ejecting apparatus may further include a cap configured to form a closed space to which the opening of the nozzle and the opening of the dummy nozzle are open between the cap and the ejection surface by covering at least a part of the ejection surface. According to such an aspect, even when the cap diverted from the liquid ejecting head which does not include the dummy flow channel covers the opening of the nozzle and the opening of the dummy nozzle with the common closed space, the dummy flow channel is closed by the closing section. Thus, the negative pressure is hardly generated in the dummy flow channel via the closed space in the suction cleaning. Therefore, the suction cleaning of the liquid flow channel can be effectively performed without manufacturing a new cap that only covers the nozzle and does not cover the dummy nozzle.

What is claimed is:

1. A liquid ejecting head comprising:

a liquid flow channel including nozzles constituting a nozzle row configured to ejecting a liquid;

a dummy flow channel including dummy nozzles constituting a dummy nozzle row not configured to eject liquid; and a closing section formed by an adhesive and closing the dummy flow channel.

2. The liquid ejecting head according to claim 1, wherein the dummy flow channel includes a dummy common liquid chamber communicating with the dummy nozzles constituting the dummy nozzle row, and the closing section is disposed upstream from the dummy common liquid chamber.

3. The liquid ejecting head according to claim 1, further comprising:

a first flow channel member formed with a first dummy portion which is a part of the dummy flow channel;

a second flow channel member having a second dummy portion which is a part of the dummy flow channel and is formed upstream from the first dummy portion, and stacked on the first flow channel member; and a first adhesive section formed by an adhesive and provided between the first flow channel member and the second flow channel member to bond the first flow channel member and the second flow channel member, wherein the first adhesive section forms the closing section.

4. The liquid ejecting head according to claim 3, wherein the closing section is provided at a portion of the dummy flow channel extending along a stacking direction of the first flow channel member and the second flow channel member.

5. The liquid ejecting head according to claim 3, wherein the first flow channel member is formed with a first portion which is a part of the liquid flow channel, the second flow channel member is formed with a second portion which is a part of the liquid flow channel and farther from the nozzle row than the first portion in the liquid flow channel, the liquid ejecting head further includes a second adhesive section formed by an adhesive and provided between the first flow channel member and the second flow channel member to bond the first flow channel member and the second flow channel member, and the second adhesive section forms a first coupling flow channel coupling the first portion and the second portion.

6. The liquid ejecting head according to claim 5, further comprising:

head chips each of which having a nozzle plate on which at least one of the nozzle row and the dummy nozzle row is formed; and a holder holding the head chips and having the second flow channel member, wherein the head chips include at least a head chip including the first flow channel member and the nozzle plate formed with the nozzle row communicating with the first portion and the dummy nozzle row communicating with the first dummy portion.

7. The liquid ejecting head according to claim 6, wherein each of the head chips has a common structure.

8. The liquid ejecting head according to claim 3, further comprising:

a third flow channel member formed with the first portion which is a part of the liquid flow channel, wherein the second flow channel member is stacked on the first flow channel member and the third flow channel member, the second flow channel member is formed with a second portion which is a part of the liquid flow channel and farther from the nozzle row than the first portion in the liquid flow channel, the liquid ejecting head further includes a third adhesive section formed by an adhesive and provided between the second flow channel member and the third flow channel member to bond the second flow channel member and the third flow channel member, and the third adhesive section forms a second coupling flow channel coupling the first portion and the second portion.

9. The liquid ejecting head according to claim 8, further comprising:

head chips each of which having a nozzle plate on which at least one of the nozzle row and the dummy nozzle row is formed; and a holder holding the plurality of head chips and having the second flow channel member, wherein the head chips include at least a head chip including the first flow channel member and the nozzle plate formed with the dummy nozzle row communicating with the first dummy portion, and a head chip including the third flow channel member and the nozzle plate formed with the nozzle row communicating with the first portion.

10. The liquid ejecting head according to claim 9, further comprising:

dummy flow channels, wherein the nozzle plate of the head chip having the first flow channel member is formed with the dummy nozzle rows adjacent to each other.

11. The liquid ejecting head according to claim 9, wherein the nozzle plate of the head chip having the first flow channel member is not formed with the nozzle row.

12. The liquid ejecting head according to claim 9, wherein a total number of rows of the nozzle row and the dummy nozzle row formed on the nozzle plate of each head chip is a common number of rows, and a total number of the dummy nozzle rows that the liquid ejecting head includes is equal to or more than the common number of rows.

13. The liquid ejecting head according to claim 1, further comprising:

a first flow channel member formed with a first dummy portion which is a part of the dummy flow channel;

a second flow channel member having a second dummy portion which is a part of the dummy flow channel and is formed upstream from the first dummy portion, and stacked on the first flow channel member; and a first adhesive section formed by an adhesive and provided between the first flow channel member and the second flow channel member to bond the first flow channel member and the second flow channel member, wherein the first adhesive section forms the closing section, the dummy flow channel includes a dummy common liquid chamber communicating with the dummy nozzles constituting the dummy nozzle row, the closing section is disposed upstream from the dummy common liquid chamber, and at least a part of the dummy common liquid chamber is defined by the first flow channel member.

14. The liquid ejecting head according to claim 1, wherein the dummy flow channel is disposed upstream from the closing section, and includes a dummy filter chamber having a filter therein.

15. The liquid ejecting head according to claim 1, wherein as the dummy flow channel, a first dummy flow channel including a plurality of dummy nozzles constituting a first dummy nozzle row as the dummy nozzle row, and a second dummy flow channel including a plurality of dummy nozzles constituting a second dummy nozzle row as the dummy nozzle row are provided, as the closing section, a first closing section closing the first dummy flow channel, and a second closing section closing the second dummy flow channel are provided, the liquid ejecting head further includes a first joining section at which the first dummy flow channel and the second dummy flow channel are joined, and the first closing section and the second closing section are disposed downstream from the first joining section.

16. The liquid ejecting head according to claim 1, further comprising:

a second joining section where the dummy flow channel and the liquid flow channel are joined, wherein the closing section is disposed downstream from the second joining section.

17. A liquid ejecting apparatus comprising:

the liquid ejecting head according to claim 1; and a liquid storage section storing the liquid supplied to the liquid ejecting head.

18. The liquid ejecting apparatus according to claim 17, wherein the liquid ejecting head includes an ejection surface on which an opening of the nozzle constituting the nozzle row and an opening of the dummy nozzle constituting the dummy nozzle row are formed, and the liquid ejecting apparatus further includes a cap configured to form a closed space to which the opening of the nozzle and the opening of the dummy nozzle are open between the cap and the ejection surface by covering at least a part of the ejection surface.

* * * * *